(12) United States Patent
Cho et al.

(10) Patent No.: US 9,405,140 B2
(45) Date of Patent: Aug. 2, 2016

(54) CURVED FRAME AND DISPLAY DEVICE INCLUDING THE SAME

(71) Applicant: Samsung Display Co., Ltd., Yongin, Gyeonggi-Do (KR)

(72) Inventors: Joo-Woan Cho, Seongnam (KR); Myoung-Seok Son, Seongnam (JP)

(73) Assignee: SAMSUNG DISPLAY CO., LTD. (KR)

( * ) Notice: Subject to any disclaimer, the term of this patent is extended or adjusted under 35 U.S.C. 154(b) by 52 days.

(21) Appl. No.: 14/217,764

(22) Filed: Mar. 18, 2014

(65) Prior Publication Data

US 2015/0062480 A1 Mar. 5, 2015

(30) Foreign Application Priority Data

Aug. 28, 2013 (KR) ........................ 10-2013-0102130

(51) Int. Cl.
*G02F 1/1333* (2006.01)
(52) U.S. Cl.
CPC *G02F 1/133308* (2013.01); *G02F 2001/13332* (2013.01); *G02F 2001/133328* (2013.01); *G02F 2201/46* (2013.01)
(58) Field of Classification Search
CPC ............... G02F 1/133308; G02F 2001/13332; G02F 2001/133328
USPC ......................................................... 349/58
See application file for complete search history.

(56) References Cited

U.S. PATENT DOCUMENTS

| | | | | |
|---|---|---|---|---|
| 2005/0168954 A1* | 8/2005 | Kim | .............................. | 361/725 |
| 2008/0100768 A1* | 5/2008 | Yang et al. | ..................... | 349/58 |
| 2009/0147171 A1* | 6/2009 | Yang et al. | ..................... | 349/58 |
| 2009/0316062 A1* | 12/2009 | Nishizawa | ..................... | 349/58 |
| 2010/0033648 A1* | 2/2010 | Kaganezawa | ................... | 349/58 |
| 2011/0096262 A1* | 4/2011 | Kikuchi | ........................ | 349/58 |

FOREIGN PATENT DOCUMENTS

| | | |
|---|---|---|
| JP | 2008-198481 A | 8/2008 |
| JP | 2010-039441 A | 2/2010 |
| JP | 2010-156830 A | 7/2010 |
| KR | 100188120 B1 | 1/1999 |
| KR | 1020070057308 A | 6/2007 |
| KR | 1020080060106 A | 7/2008 |
| KR | 1020100090847 A | 8/2010 |
| KR | 1020110002515 A | 1/2011 |
| KR | 1020110004566 A | 1/2011 |
| KR | 1020110013338 A | 2/2011 |
| KR | 101221196 B1 | 1/2013 |

\* cited by examiner

*Primary Examiner* — Thanh-Nhan P Nguyen
(74) *Attorney, Agent, or Firm* — Cantor Colburn LLP

(57) ABSTRACT

A curved frame for securing a display panel includes two long-side frame parts having a curved shape, each of the two long-side frame parts including a groove member provided through each of edge portions thereof and a first coupling hole defined to penetrate the groove member, and two short-side frame parts having a straight line shape, each of the two short-side frame parts including a protruding member provided in correspondence with the groove member of the two long-side frame parts and a second coupling hole defined to penetrate the protruding member, each of the two short-side frame parts being coupled to the two long-side frame parts to define a rectangular frame shape.

15 Claims, 15 Drawing Sheets

CURVED FRAME AND DISPLAY DEVICE INCLUDING THE SAME

This application claims priority to Korean Patent Application No. 10-2013-0102130, filed on Aug. 28, 2013, and all the benefits accruing therefrom under 35 U.S.C. §119, the contents of which are herein incorporated by reference in their entirety.

BACKGROUND

1. Field

Exemplary embodiments of the invention relate to a curved frame and a display device including the curved frame. More particularly, exemplary embodiments of the invention relate to a curved frame capable of uniformly maintaining a curvature of a curved display panel and a display device including the curved frame.

2. Discussion of the Related Art

In recent years, as a liquid crystal display device ("LCD") has come to be used as display devices of television receivers, screens of such LCDs have become increasingly larger. But a problem with increasingly larger television LCD screens is that a viewing angle difference between a viewing angle when a viewer views a center portion of the screen and a viewing angle when the viewer views left and right edges of the screen increases. In this regard, the technical term "viewing angle" may be defined as an angle between a line of sight of the viewer viewing the screen and a tangent to an intersection between the line of sight and an observed screen surface, and the difference between the center and left/right edge viewing angles may be defined as the "viewing angle difference".

Furthermore, another problem with large-scale television LCD screens is that glare off the screens also increases. The problem of the viewing angle difference can be corrected by curving the screen into a concave shape.

However, even when the viewing angle difference is improved by an LCD panel with a concavely curved screen (also referred to as "concavely curved LCD panel" below), when using a backlight with the same structure as that of a conventional flat LCD panel for such a concavely curved LCD panel, there is the problem that a uniformity of light that is emitted from a light source inside a backlight is lost in particular at peripheral edges of the concavely curved LCD panel. As a result, an image quality of the concavely curved LCD panel becomes lower than that of the screen of a conventional flat LCD device. As a countermeasure for solving this problem and using the backlight for a conventional flat LCD panel is to enlarge the space in which the light source of the backlight is arranged.

In order to safely dispose a backlight assembly on a curved LCD panel, a curved frame securing the backlight assembly to a curved LCD panel has a curved shape. Two curved horizontal frames and two vertical frames are coupled to each other, so that a curved rectangular frame is completed, for example.

SUMMARY

As times passes, a twisting of the curved horizontal frames generated by a spring back effect is generated. Thus, a curvature of a curved display device is varied to decrease display characteristics of the curved display device.

Exemplary embodiments of the invention provide a curved frame capable of effectively preventing twisting of a rectangular frame to effectively prevent display characteristics of a display device from being decreased.

Exemplary embodiments of the invention also provide a display device having the above-mentioned curved frame.

According to one exemplary embodiment of the invention, a curved frame for securing a display panel includes two long-side frame parts and two short-side frame parts. The two long-side frame parts have a curved shape. Each of the two long-side frame parts includes a groove member provided through each of edge portions thereof and a first coupling hole defined to penetrate the groove member. The two short-side frame parts have a straight line shape. Each of the two short-side frame parts includes a protruding member provided in correspondence with the groove member of the two long-side frame parts and a second coupling hole defined to penetrate the protruding member. Each of the two short-side frame parts is coupled to the two long-side frame parts to define a rectangular frame shape.

In an exemplary embodiment, the protruding member and the groove member may have a polygon shape. The protruding member may be inserted to the groove member. In this case, the polygon shape may have a parallelogram shape. A width of the parallelogram shape may be decreased toward a center portion of an upper frame part of the two long-side frame parts from the edge portions of the two long-side frame parts.

In an exemplary embodiment, the protruding member and the groove member may have a wedge shape. The protruding member may be inserted into the groove member in a slide type. In this case, the wedge shape may be extended in a length direction of the two long-side frame parts or a normal line direction of the length direction.

In an exemplary embodiment, the two long-side frame parts and the two short-side frame parts may be coupled to each other. In this case, each of screws may be coupled to edge portions of the short frame part via the edge portions of the two long-side frame parts, respectively.

In an exemplary embodiment, a guide rail part may be provided through the two long-side frame parts and the short-side frame parts, respectively.

In an exemplary embodiment, the two long-side frame parts and the short-side frame parts may include an injection molding material.

According to one exemplary embodiment of the invention, a display device includes a display panel, a backlight unit and a curved frame. The backlight unit is disposed on a rear surface of the display panel. The curved frame secures the display panel and the backlight unit. The curved frame includes two long-side frame parts and two short-side frame parts. The two long-side frame parts have a curved shape. Each of the two long-side frame parts includes a groove member provided through each of edge portions and a first coupling hole defined to penetrate the groove member. The two short-side frame parts have a straight line shape. Each of the two short-side frame parts includes a protruding member provided in correspondence with the groove member of the two long-side frame parts and a second coupling hole defined to penetrate the protruding member. Each of the two short-side frame parts is coupled to the two long-side frame parts to define a rectangular frame shape.

In an exemplary embodiment, the protruding member and the groove member may have a polygon shape. The protruding member may be inserted to the groove member.

In an exemplary embodiment, the protruding member and the groove member may have a wedge shape. The protruding member may be inserted into the groove member in a slide type.

In an exemplary embodiment, the two long-side frame parts and the two short-side frame parts may be coupled to each other by four screws.

According to a curved frame and a display device having the curved frame, in frame parts coupled to each other to form a curved rectangular frame, a protruding member is disposed on one frame part and a groove member is provided through another frame part, so that a twisting of a curved rectangular frame may be effectively prevented so that it may effectively prevent display characteristics of a display device from being decreased.

BRIEF DESCRIPTION OF THE DRAWINGS

The above and other features and exemplary embodiments of the invention will become more apparent by describing in detailed exemplary embodiments thereof with reference to the accompanying drawings, in which.

DETAILED DESCRIPTION

Figure 1:
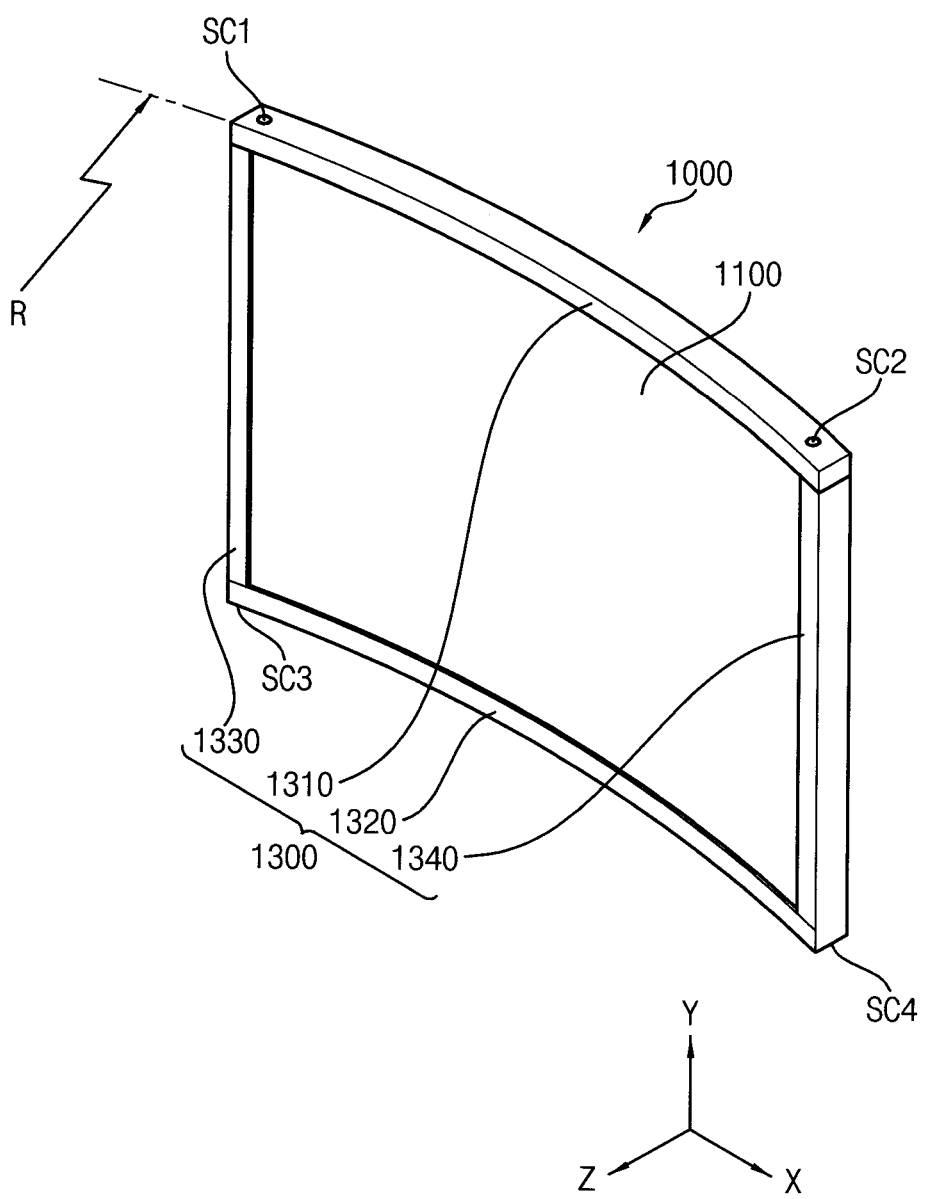
FIG. 1 is a perspective view schematically illustrating an exemplary embodiment of a curved display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a curved frame and a display device having the curved frame according to the invention will be explained in detail with reference to the accompanying drawings.

Figure 2:
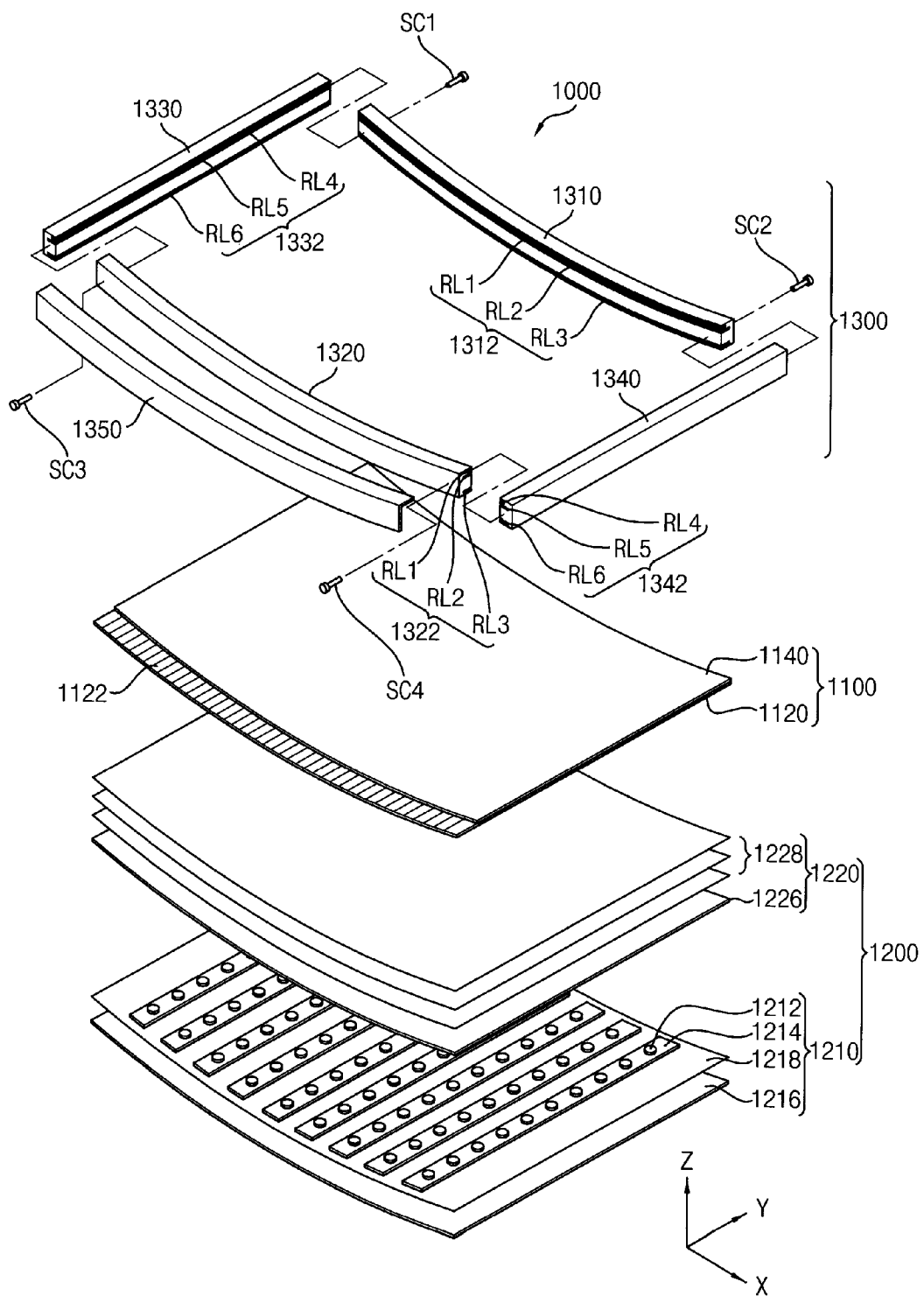
FIG. 2 is an exploded perspective view schematically illustrating a curved display device of FIG. 1.

FIG. 1 is a perspective view schematically illustrating a curved display device 1000 according to an exemplary embodiment of the invention. FIG. 2 is an exploded perspective view schematically illustrating a curved display device 1000 of FIG. 1.

Referring to FIGS. 1 and 2, a curved display device 1000 according to an exemplary embodiment of the invention includes a display panel 1100, a backlight unit 1200 and a concavely curved frame 1300 to be concavely bent to have a uniform curvature when viewed from an X-Y plane. A curvature radius R corresponding to the curvature may be about 1,000 millimeters (mm) to about 4,000 mm.

The display panel 1100 may have a curved shape of a uniform curvature when viewed from an X-Y plane. In an exemplary embodiment, the display panel 1100 may be a liquid crystal display ("LCD") panel, a plasma display panel ("PDP"), an organic light-emitting display ("OLED") panel, etc. In the exemplary embodiment, the display panel 1100 may include an LCD panel including an array substrate 1120, a color filter substrate 1140 facing the array substrate 1120, and a liquid crystal layer interposed between the array substrate 1120 and the color filter substrate 1140. A size of the color filter substrate 1140 is substantially smaller than that of the array substrate 1120. Thus, an area not covered by the color filter substrate 1140 is exposed. A pad part 1122 is disposed on an exposed area of the array substrate 1120.

In an exemplary embodiment, the display panel 1100 may be curved before the display panel 1100 is inserted into the concavely curved frame 1300. In another exemplary embodiment, the display panel 1100 may be curved after the display panel 1100 is inserted into the concavely curved frame 1300. In an exemplary embodiment, when the display panel 1100 has a flexible type, the display panel 1100 may be curved after the display panel 1100 is inserted into the concavely curved frame 1300, for example. In another exemplary embodiment, when the display panel 1100 has a ridge type, the display panel 1100 may be manufactured to have a curved shape of a predetermined curvature before the display panel 1100 is inserted into the concavely curved frame 1300, for example.

The display panel 1100 may have a curved shape by various manufacturing methods. In an exemplary embodiment, a flat display panel is disposed between a first curved mold of a concave shape and a second curved mold of a convex shape facing the first curved mold, and then the display panel 1100 may be manufactured through a heat treatment and a pressing treatment. In this case, a bottom surface of an array substrate of the flat display panel is disposed to contact the first curved mold.

The array substrate is a substrate on which thin-film transistors ("TFTs") that are switching elements are provided in a matrix shape. In the exemplary embodiment, the array substrate 1120 has a curved shape of uniform curvature. In an exemplary embodiment, the TFT has a source terminal connected to a data line, a gate terminal connected to a gate line and a drain terminal connected to a pixel electrode of a transparent conductive material. A data pad part 1122 extended from the data line is disposed on a non-display area of the array substrate 1120. Alternatively, a gate pad part extended from the gate line may be further disposed on the non-display area of the array substrate 1120.

The color filter substrate 1140 is disposed to face the array substrate 1120. The color filter substrate 1140 includes a red pixel, a green pixel and a blue pixel that are provided to realize colors. In the illustrated exemplary embodiment, the color filter substrate 1140 has a curved shape of uniform curvature. A common electrode is disposed on the color filter substrate 1140, which is opposite to the pixel electrode of the array substrate 1120. The common electrode includes an optically transparent and electrically conductive material.

In another exemplary embodiment, the display panel 1100 may include an array substrate on which color filters are provided and an opposite substrate on which a common electrode is provided to face the array substrate.

When a power is applied to a gate terminal of the TFT and the TFT is turned on, an electric field is generated between the pixel electrode and the common electrode. The electric field varies an aligning angle of the liquid crystal molecules interposed between the array substrate 1120 and the color filter substrate 1140. Thus, a light transmittance of the liquid crystal layer is varied in accordance with the variation of the aligning angle of the liquid crystal, so a desired image may be obtained.

The display panel 1100 may include a first polarization film (not shown) disposed below the array substrate 1120 and a second polarization film (not shown) disposed on the color filter substrate 1140. The first polarization film includes a light transmitting axis of a first direction to polarize lights in a first direction. The second polarization film includes a light transmitting axis of a second direction to polarize lights in a second direction. In an exemplary embodiment, the light transmitting axis of the first polarization film may substantially perpendicular to the light transmitting axis of the second polarization film.

The backlight unit 1200 is disposed at a rear surface of the display panel 1100 to provide lights to the curved display panel 1100. In the illustrated exemplary embodiment, the backlight unit 1200 may have a curved shape which is bent in accordance with a curvature of the display panel 1100. In the illustrated exemplary embodiment, a curvature radius of the backlight unit 1200 may be about 1,000 mm to about 5,000 mm. In the illustrated exemplary embodiment, when the display panel 1100 has a curvature radius of one of about 1,000 mm to about 4,000 mm, the backlight unit 1200 may have a curvature radius substantially greater than a curvature radius of the display panel 1100. In an exemplary embodiment, when the display panel 1100 has a curvature radius of about 3,000 mm, for example, the backlight unit 1200 may have a curvature radius substantially greater than about 3,000 mm and substantially smaller than about 5,000 mm.

The backlight unit 1200 includes a light source assembly 1210 emitting lights and an optical assembly 1220 enhancing light characteristics emitted from the light source assembly 1210. In the illustrated exemplary embodiment, a curvature radius of the optical assembly 1220 may be substantially greater than a curvature radius of the display panel 1100, and may be substantially smaller than a curvature radius of the light source assembly 1210.

The light source assembly 1210 includes a plurality of light-emitting diode ("LED") packages 1212 emitting lights and a printed circuit board ("PCB") 1214 on which the LED packages 1212 are mounted. A signal wiring (not shown) for providing the LED packages 1212 with driving voltages, is disposed on the PCB 1214. In an exemplary embodiment, the light source assembly 1210 may be disposed in correspondence with a direction parallel with a long side of the display panel 1100. In another exemplary embodiment, the light source assembly 1210 may be disposed in correspondence with a direction parallel with a short side of the display panel 1100.

In the illustrated exemplary embodiment, a distance between the LED packages 1212 and the display panel 1100 is substantially uniform.

Conventionally, a flat display panel is bent to be a curved display panel 1100 having a concave shape. In this case, a color filter substrate 1140 is compressed to induce a buckling phenomenon. When the buckling phenomenon is generated, a cell gap of a liquid crystal layer may be increased in correspondence with a corresponding area. When a cell gap of a liquid crystal layer is increased in correspondence with a specific portion of a display panel, a blue transmittance ratio is decreased rather than another portion of the display panel so that yellowish may be generated.

Thus, in the illustrated exemplary embodiment, in order to effectively prevent a blue transmittance ratio inducing the yellowish from being decreased, it may vary a disposing or a structure of the LED packages 1212. In an exemplary embodiment, when viewed from an X-Y plane of the display panel 1100, a light amount of blue, which are emitted from the LED packages 1212 disposed on a middle area between a central portion parallel with Y-axis and an edge portion parallel with Y-axis, may be increased. In an exemplary embodiment, it may increase a number of blue LEDs rather than a number of red LEDs or a number of green LEDs, thereby increasing a light amount of blue. For another exemplary embodiment, it may increase a voltage provided to a blue LED rather than a voltage provided to a red LED or a voltage provided to a green LED, thereby increasing a light amount of blue.

The light source assembly 1210 may further include a bottom plate 1216 and a reflection sheet 1218.

The bottom plate 1216 has a curved shape of a uniform curvature to secure the light source assembly 1210. In the illustrated exemplary embodiment, the bottom plate 1216 secures PCBs 1214 having LED packages 1212 mounted thereon. In the illustrated exemplary embodiment, the bottom plate 1216 may have a curved shape by various manufacturing methods. In an exemplary embodiment, a flat bottom plate is disposed between a first curved mold of a concave shape and a second curved mold of a convex shape facing the first curved mold, and then the bottom plate 1216 may be manufactured through a heat treatment and a pressing treatment. In this case, a bottom surface of the flat bottom plate is disposed to contact the first curved mold.

The reflection sheet 1218 is disposed on the bottom plate 1216 and is disposed below the light source assembly 1210 to reflect lights incident from the light source assembly 1210 toward the diffusion plate 1226.

The optical assembly 1220 may include a diffusion plate 1226 and optical sheets 1228.

The diffusion plate 1226 has a curved shape of uniform curvature. The diffusion plate 1226 diffuses lights emitted from the light source assembly 1210 or lights reflected by the reflection sheet 1218 to provide the optical sheets 1228 with the diffused lights. In the illustrated exemplary embodiment, the diffusion plate 1226 may have a curved shape by various manufacturing methods. In an exemplary embodiment, a flat diffusion plate is disposed between a first curved mold of a concave shape and a second curved mold of a convex shape facing the first curved mold, and then the diffusion plate 1226 may be manufactured through a heat treatment and a pressing treatment. In this case, a bottom surface of the flat bottom plate is disposed to contact the first curved mold.

The optical sheets 1228 are disposed on the diffusion plate 1226 to increase efficiency of lights incident from the diffusion plate 1226. In an exemplary embodiment, the optical sheets 1228 may include a diffusion sheet re-diffusing lights diffused by the diffusion plate 1226 and a prism sheet condensing the lights diffused by the diffusion sheet. In an exemplary embodiment, the prism sheet may include a vertical prism sheet condensing lights in a vertical direction and a horizontal prism sheet condensing lights in a horizontal direction.

The concavely curved frame 1300 includes an upper frame part 1310, a lower frame part 1320, a left frame part 1330 and a right frame part 1340 to secure the display panel 1100 and the backlight unit 1200. The concavely curved frame 1300 has a curved shape of uniform curvature. In the illustrated exemplary embodiment, the upper frame part 1310 and the lower frame part 1320 define a long-side frame part, and the left frame part 1330 and the right frame part 1340 define a short-side frame part. In the illustrated exemplary embodiment, in frame parts coupled to each other to form a concavely curved frame 1300, a protruding member is disposed on one frame part and a groove member is provided through another frame part, so that a twisting of a concavely curved frame 1300 may be effectively prevented.

In an exemplary embodiment, protruding members are provided in two edge portions of the left frame part 1330 and in two edge portions of the right frame part 1340, respectively, and groove members in which the protruding member is inserted are defined through two edge portions of the upper frame part 1310 and through two edge portions of the lower frame part 1320, respectively. Thus, when the protruding members are coupled to the frame parts 1310, 1320, 1330 and 1340 to form a concavely curved frame 1300, the protruding member is inserted into the groove member to be secured so that a twisting of a concavely curved frame 1300 generated by a spring back effect may be effectively prevented.

A first guide rail portion 1312, which is defined in a surface of the corresponding frame part bent to have a first curvature to guide an upper side of the display panel 1100 and an upper side of the backlight unit 1200, is provided through the upper frame part 1310. The upper frame part 1310 is coupled to the left frame part 1330 through a first fastening member such as a screw SC1, and is coupled to the right frame part 1340 through a second fastening member such as a screw SC2.

A second guide rail portion 1322, which is defined in the surface of the corresponding frame part bent to have the first curvature to guide a lower side of the display panel 1100 and a lower side of the backlight unit 1200, is provided through the lower frame part 1320. The lower frame part 1320 is coupled to the left frame part 1330 through a third fastening member such as a screw SC3, and is coupled to the right frame part 1340 through a fourth fastening member such as a screw SC4.

In the illustrated exemplary embodiment, each of the first and second guide rail portions 1312 and 1322 includes a first rail RL1, a second rail RL2 and a third rail RL3.

The first rail RL1 is provided adjacent to a front surface of corresponding frame part to guide an upper side (or a lower side) of the display panel 1100. The first rail RL1 is defined in a surface of the corresponding frame part bent to correspond to an upper side (or a lower side) of the display panel 1100 having a curved shape of a uniform curvature.

The second rail RL2 is provided in a rear surface of the first rail RL1 to guide the optical assembly 1220 of the backlight unit 1200. The second rail RL2 is defined in the surface of the corresponding frame part bent to correspond to the optical assembly 1220 having a curved shape of a uniform curvature.

The third rail RL3 is provided between a rear surface of the second rail RL2 and a rear surface of corresponding frame part to guide the light source assembly 1210 of the backlight unit 1200. The third rail RL3 is defined in the surface of the corresponding frame part bent to correspond to the light source assembly 1210 having a curved shape of a uniform curvature.

The left frame part 1330 has a straight line shape to be coupled to a first end of the upper frame part 1310 and a first end of the lower frame part 1320. In an exemplary embodiment, the coupling may be realized through nuts, bolts, etc. A third guide rail portion 1332 is provided through the left frame part 1330 so as to guide a left side of the display panel 1100 and a left side of the backlight unit 1200. In the illustrated exemplary embodiment, the left frame part 1330 is coupled to the upper frame part 1310 through the first screw SC1, and is coupled to the lower frame part 1320 through the third screw SC3. A third guide rail portion 1332 is provided at the left frame part 1330 so as to guide a left side of the display panel 1100 and a left side of the backlight unit 1200.

The right frame part 1340 has a straight line shape to be coupled to a second end of the upper frame part 1310 and a second end of the lower frame part 1320. The coupling may be realized through nuts, bolts, etc. In the illustrated exemplary embodiment, the right frame part 1340 is coupled to the upper frame part 1310 through the second screw SC2, and is coupled to the lower frame part 1320 through the fourth screw SC3. A fourth guide rail portion 1342 is provided through the right frame part 1340 so as to guide a right side of the display panel 1100 and a right side of the backlight unit 1200.

In the illustrated exemplary embodiment, each of the third and fourth guide rail portions 1332 and 1342 includes a fourth rail RL4, a fifth rail RL5 and a sixth rail RL6.

The fourth rail RL4 is provided adjacent to a front surface of corresponding frame part to guide a left side (or a right side) of the display panel 1100. In the illustrated exemplary embodiment, since left side and right side of the display panel 1100 are a straight line shape, the fourth rail RL4 has a straight line shape.

The fifth rail RL5 is provided in a rear surface of the fourth rail RL4 to guide a left side (or a right side) of an optical assembly 1220 of the backlight assembly 1220. In the illustrated exemplary embodiment, since left side and right side of the optical assembly 1220 are a straight line shape, the fifth rail RL5 has a straight line shape.

The sixth rail RL6 is disposed between a rear surface of the fifth rail RL5 and a rear surface of a corresponding frame part to guide a light source assembly 1210 of the backlight assembly 1200. In the illustrated exemplary embodiment, since left side and right side of the light source assembly 1210 are a straight line shape, the sixth rail RL6 has a straight line shape.

The concavely curved frame 1300 may further include a frame cover 1350 covering the lower frame part 1320.

Figure 3:
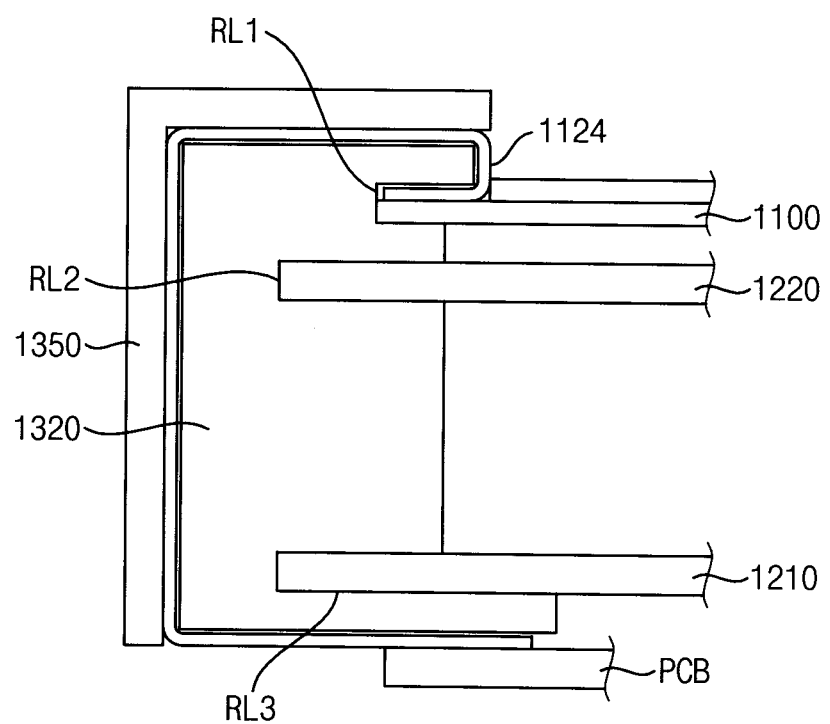
FIG. 3 is a cross-sectional view schematically illustrating a frame cover coupled to a lower frame part of FIG. 2.

FIG. 3 is a cross-sectional view schematically illustrating a frame cover 1350 coupled to a lower frame part 1320 of FIG. 2.

Referring to FIGS. 2 and 3, a lower side of the display panel 1100 is inserted into a lower frame part 1320. In an exemplary embodiment, a flexible film 1124 may be attached to a pad portion 112 of the display panel 1100. The flexible film 1124 may be bent along a front surface, a side surface and a rear surface of the lower frame part 1320. The flexible film 1124 may be attached to a PCB on an area adjacent to a rear surface of the lower frame part 1320. The PCB provides the display panel 1100 with various signals for driving the display panel 1100 through the flexible film 1124. In the illustrated exemplary embodiment, the frame cover 1350 may be coupled to the lower frame part 1320 to cover the flexible film 1124 bent along a surface of the lower frame part 1320. Thus, the frame cover 1350 may protect the flexible film from an external foreign substance.

Figure 4A:
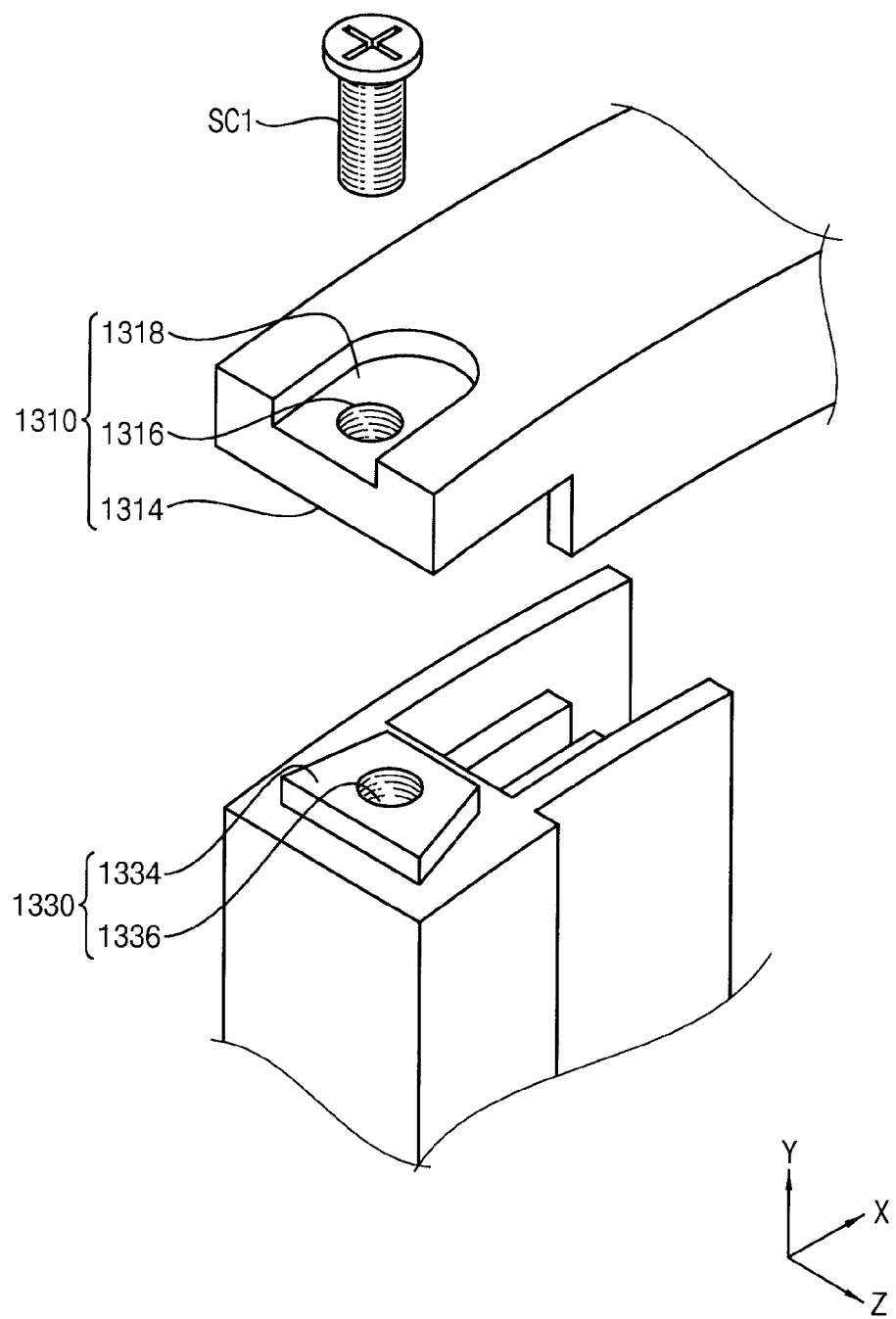
FIG. 4A is a partial exploded perspective view schematically illustrating an upper horizontal frame and a left vertical frame shown in FIG. 2.
Figure 4B:
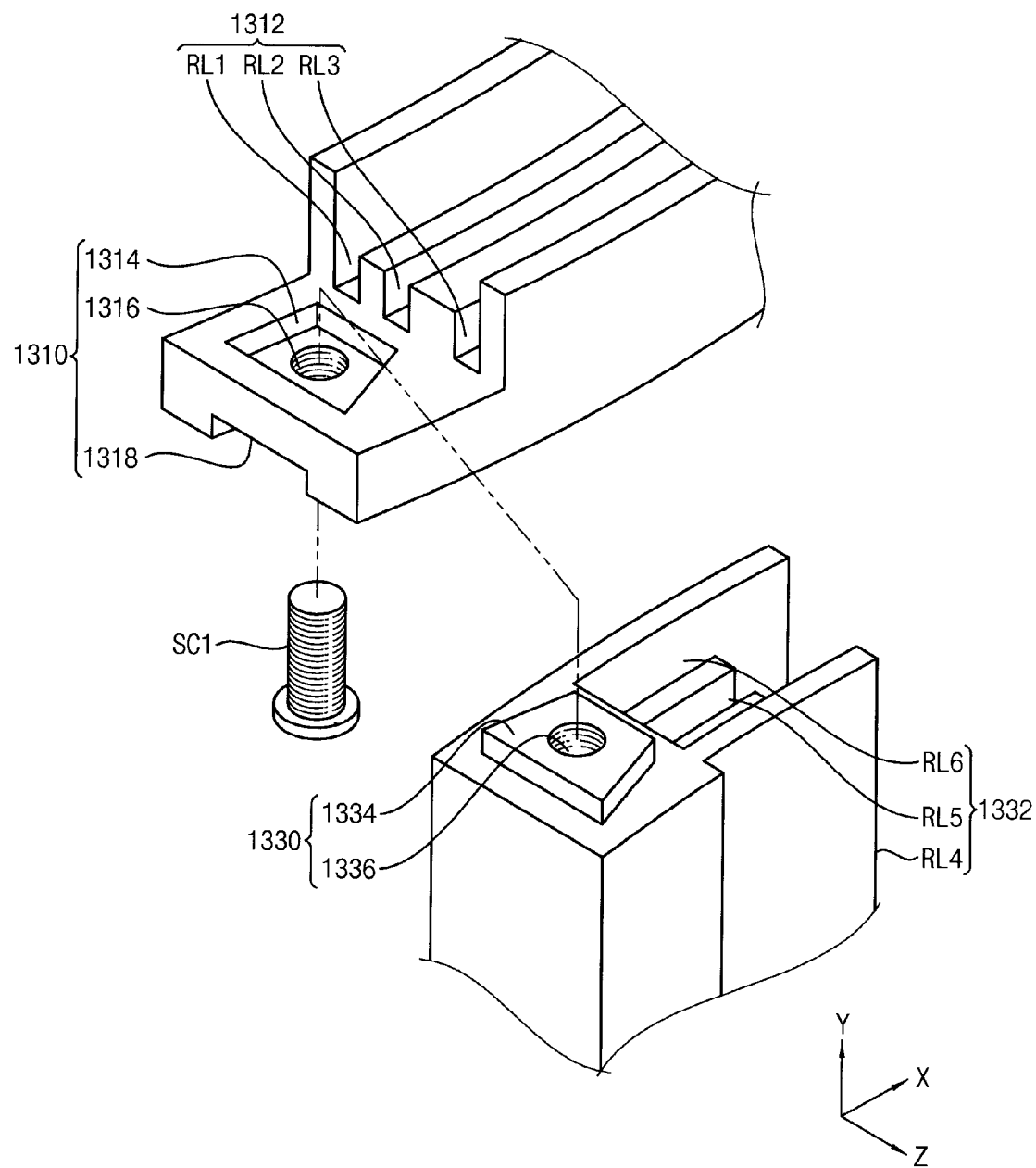
FIG. 4B is a partial exploded perspective view schematically illustrating a rear surface portion of the upper horizontal frame shown in FIG. 4A.
Figure 4C:
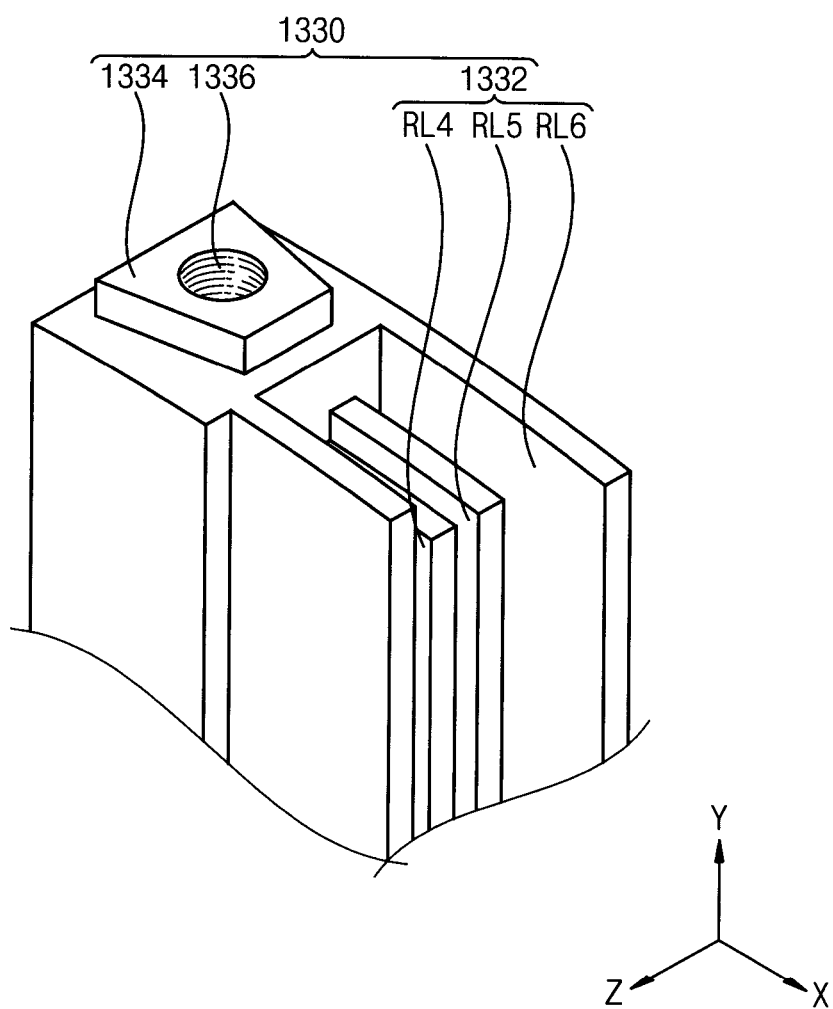
FIG. 4C is a partial exploded perspective view schematically illustrating a left vertical frame shown in FIG. 4A.

FIG. 4A is a partial exploded perspective view schematically illustrating an upper frame part 1310 and a left frame part 1330 shown in FIG. 2. FIG. 4B is a partial exploded perspective view schematically illustrating a rear surface portion of the upper frame part 1310 shown in FIG. 4A. FIG. 4C is a partial exploded perspective view schematically illustrating a left frame part 1330 shown in FIG. 4A.

Referring to FIGS. 1 to 4C, a groove member 1314 and a first coupling hole 1316 are defined through a first surface of an edge portion of the upper frame part 1310 coupled to an edge portion of the left frame part 1330. The first coupling hole 1316 is defined to penetrate a center portion of the groove member 1314. A groove 1318 for coupling a screw may be provided through a second surface of an edge portion of the upper frame part 1310. In an exemplary embodiment, a depth of the groove 1318 for coupling a screw may correspond with a thickness of a head of the first screw SC1.

A protruding member 1334 and a second coupling hole 1336 are defined through an edge portion of the left frame part 1330 facing the first surface of the edge portion of the upper frame part 1310. The protruding member 1334 is provided to correspond with a groove member 1314 of the upper frame part 1310. The second coupling hole 1336 is defined to penetrate a center portion of the protruding member 1334.

In the illustrated exemplary embodiment, the protruding member 1334 has a quadrilateral shape, and the groove member 1314 has a quadrilateral shape so as to insert the protruding member 1334. In an exemplary embodiment, the quadrilateral shape may have a parallelogram shape, a trapezoid shape, a diamond shape, a rectangle shape, a square shape, etc. When the protruding member 1334 has a parallelogram shape, a width of the parallelogram shape may be decreased toward a center portion of the upper frame part 1310 from a long-side frame part, for example, an edge portion of the upper frame part 1310. When the upper frame part 1310 is coupled to the left frame part 1330, the protruding member 1334 is inserted into the groove member 1314. Thus, a twisting generated by a spring back effect in the upper frame part 1310 and left frame part 1330 that are coupled to each other may be effectively prevented.

A description for a right frame part 1340 (shown in FIGS. 1 and 2) and an upper frame part 1310 (shown in FIGS. 1 and 2) which are coupled to each other may be similar to a description for the left frame part 1330 and the upper frame part 1310 described with reference to FIGS. 4A to 4C, and thus any detailed explanation may be omitted.

Moreover, a description for a left frame part 1330 (shown in FIGS. 1 and 2) and a lower frame part 1320 (shown in FIGS. 1 and 2) which are coupled to each other may be similar to a description for the left frame part 1330 and the upper frame part 1310 described with reference to FIGS. 4A to 4C, and thus any detailed explanation may be omitted.

Moreover, a description for a right frame part 1340 (shown in FIGS. 1 and 2) and a lower frame part 1320 (shown in FIGS. 1 and 2) which are coupled to each other may be similar to a description for the left frame part 1330 and the upper frame part 1310 described with reference to FIGS. 4A to 4C, and thus any detailed explanation may be omitted.

Figure 5:
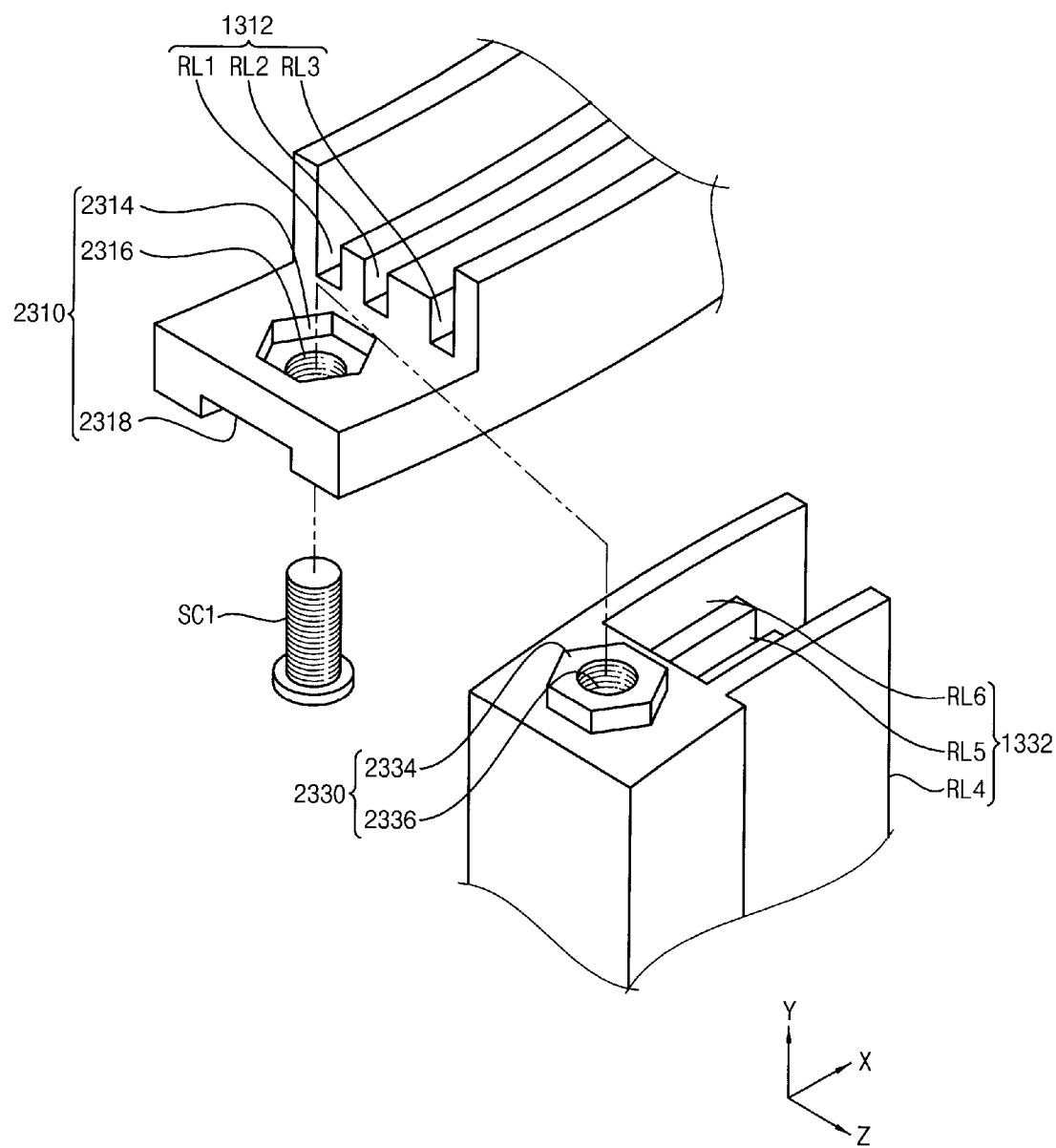
FIG. 5 is a partial exploded perspective view schematically illustrating another exemplary embodiment of an upper horizontal frame and a left vertical frame in accordance with the invention.

FIG. 5 is a partial exploded perspective view schematically illustrating an upper horizontal frame and a left vertical frame in accordance with another exemplary embodiment of the invention.

Referring to FIGS. 1, 2 and 5, a groove member 2314 and a first coupling hole 2316 are defined through a first surface of an edge portion of the upper frame part 2310 coupled to an edge portion of the left frame part 2330. The first coupling hole 2316 is defined to penetrate a center portion of the groove member 2314. A groove 2318 for coupling a screw may be provided through a second surface of an edge portion of the upper frame part 2310. A depth of the groove 2318 for coupling a screw may correspond with a thickness of a head of the first screw SC1.

A protruding member 2334 and a second coupling hole 2336 are defined through an edge portion of the left frame part 2330 facing the first surface of the edge portion of the upper frame part 2310. The protruding member 2334 is provided to correspond with a groove member 2314 of the upper frame part 2310. The second coupling hole 2336 is defined to penetrate a center portion of the protruding member 2334.

In the illustrated exemplary embodiment, the protruding member 2334 has a hexagon shape, and the groove member 2314 has a hexagon shape to receive the protruding member 2334. In the illustrated exemplary embodiment, it is described that the protruding member 2334 and the groove member 2314 have a hexagon shape. In another exemplary embodiment, the protruding member 2334 and the groove member 2314 may have a pentagon shape, a heptagon shape, an octagon shape, etc. When the upper frame part 2310 is coupled to the left frame part 2330, the protruding member 2334 is inserted into the groove member 2314. Thus, a twisting generated by a spring back effect in the upper frame part 1310 and left frame part 1330 that are coupled to each other may be effectively prevented.

Figure 6:
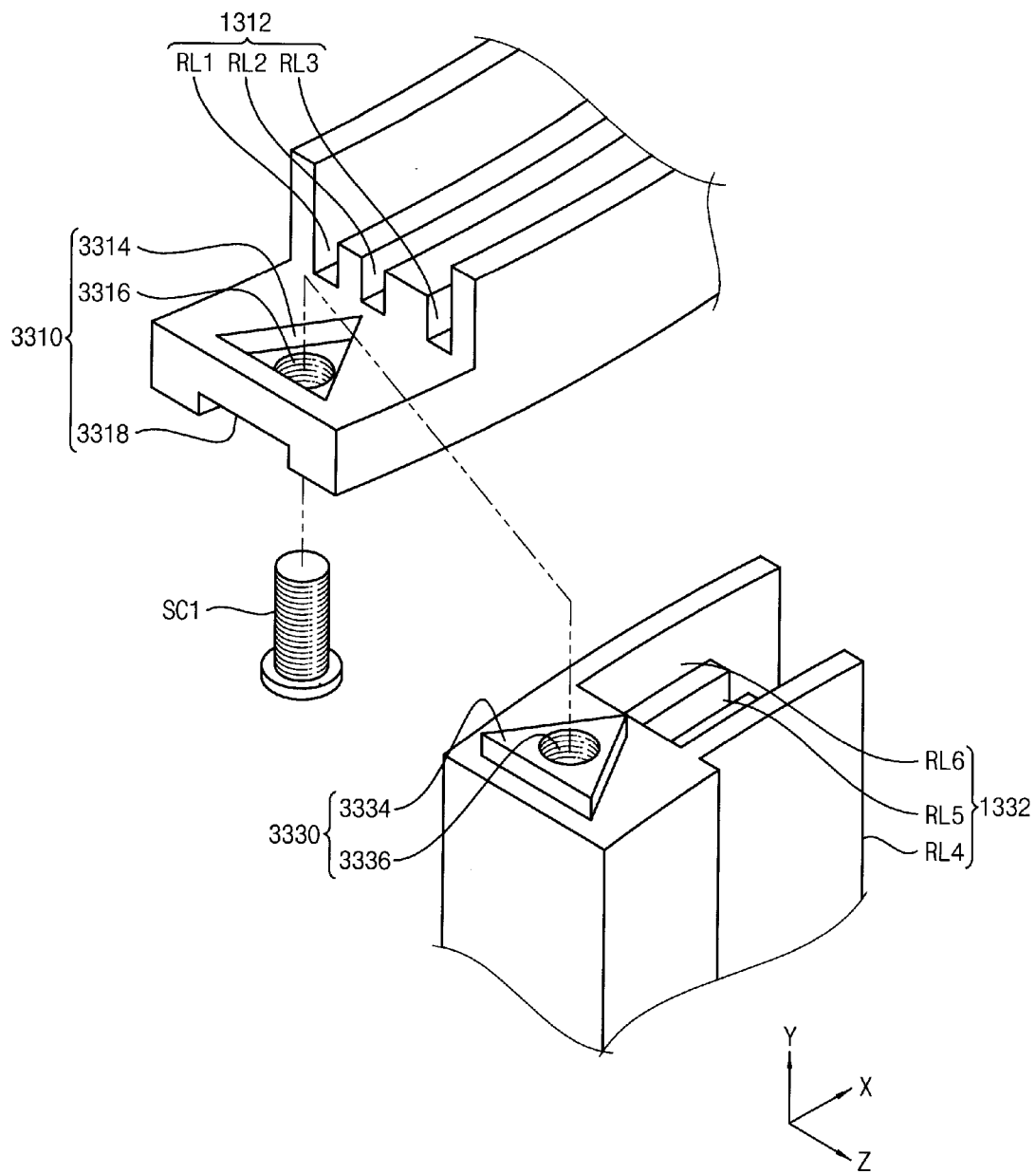
FIG. 6 is a partial exploded perspective view schematically illustrating another exemplary embodiment of an upper horizontal frame and a left vertical frame in accordance with the invention.

FIG. 6 is a partial exploded perspective view schematically illustrating an upper horizontal frame and a left vertical frame in accordance with another exemplary embodiment of the invention.

Referring to FIGS. 1, 2 and 6, a groove member 3314 and a first coupling hole 3316 are defined through a first surface of an edge portion of the upper frame part 3310 coupled to an edge portion of the left frame part 3330. The first coupling hole 3316 is defined to penetrate a center portion of the groove member 3314. A groove 3318 for coupling a screw may be provided through a second surface of an edge portion of the upper frame part 3310. A depth of the groove 3318 for coupling a screw may correspond with a thickness of a head of the first screw SC1.

A protruding member 3334 and a second coupling hole 3336 are defined through an edge portion of the left frame part 3330 facing the first surface of the edge portion of the upper frame part 3310. The protruding member 3334 is provided to correspond with a groove member 3314 of the upper frame part 3310. The second coupling hole 3336 is defined to penetrate a center portion of the protruding member 3334.

In the illustrated exemplary embodiment, the protruding member 3334 has a triangular shape, and the groove member 3314 has a triangular shape so as to insert the protruding member 3334. When the upper frame part 3310 is coupled to the left frame part 3330, the protruding member 3334 is inserted into the groove member 3314. Thus, a twisting generated by a spring back effect in the upper frame part 3310 and left frame part 3330 that are coupled to each other may be effectively prevented.

Figure 7:
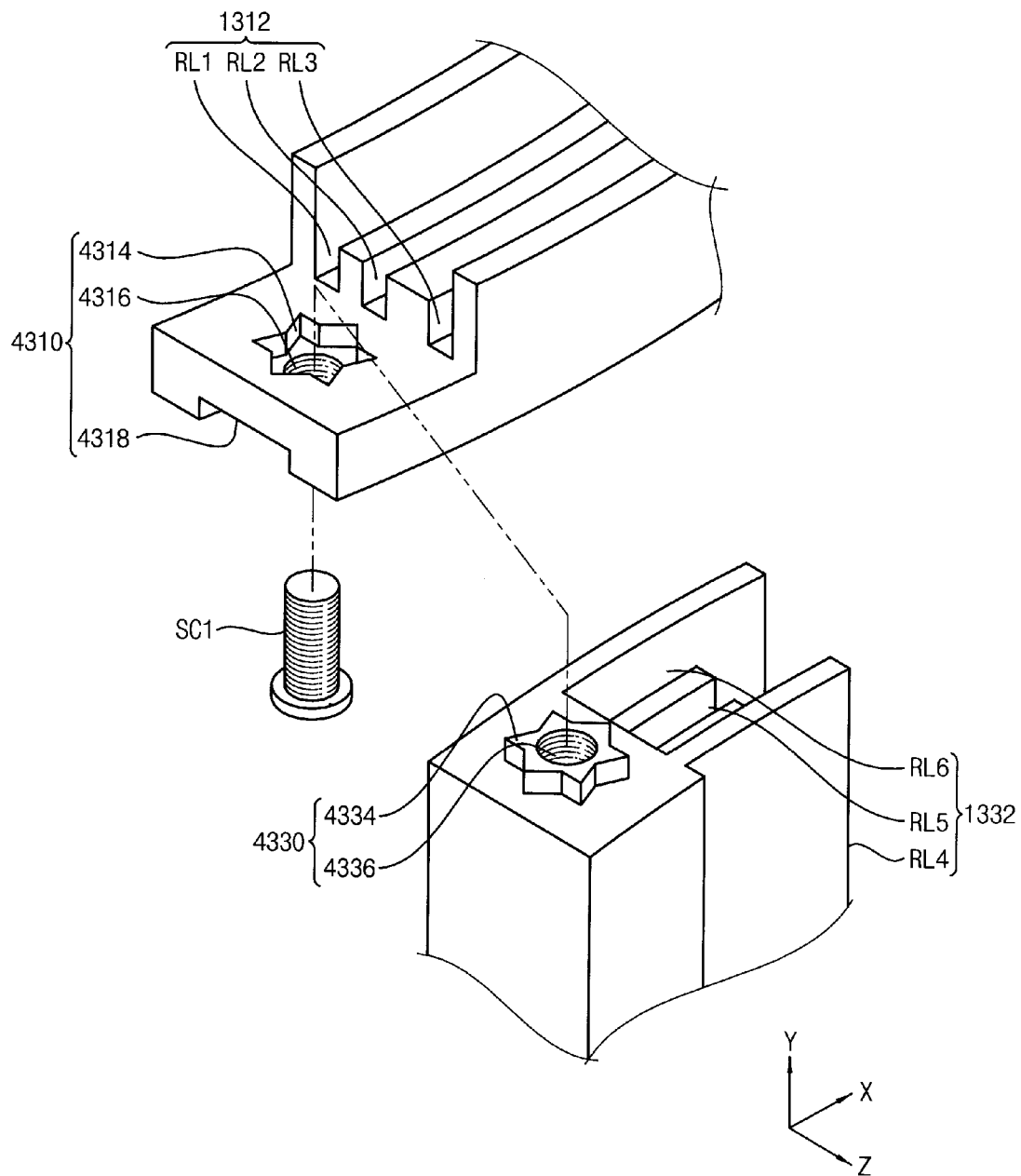
FIG. 7 is a partial exploded perspective view schematically illustrating another exemplary embodiment of an upper horizontal frame and a left vertical frame in accordance with the invention.

FIG. 7 is a partial exploded perspective view schematically illustrating an upper horizontal frame and a left vertical frame in accordance with another exemplary embodiment of the invention.

Referring to FIGS. 1, 2 and 7, a groove member 4314 and a first coupling hole 4316 are defined through a first surface of an edge portion of the upper frame part 4310 coupled to an edge portion of the left frame part 4330. The first coupling hole 4316 is defined to penetrate a center portion of the groove member 4314. A groove 4318 for coupling a screw may be provided through a second surface of an edge portion of the upper frame part 4310. A depth of the groove 4318 for coupling a screw may correspond with a thickness of a head of the first screw SC1.

A protruding member 4334 and a second coupling hole 4336 are defined through an edge portion of the left frame part 4330 facing the first surface of the edge portion of the upper frame part 4310. The protruding member 4334 is provided to correspond with a groove member 4314 of the upper frame part 4310. The second coupling hole 4336 is defined to penetrate a center portion of the protruding member 4334.

In the illustrated exemplary embodiment, the protruding member 4334 has a star shape, and the groove member 4314 has a star shape so as to insert the protruding member 4334. When the upper frame part 4310 is coupled to the left frame part 1330, the protruding member 4334 is inserted into the groove member 4314. Thus, a twisting generated by a spring back effect in the upper frame part 4310 and left frame part 4330 that are coupled to each other may be effectively prevented.

Figure 8:
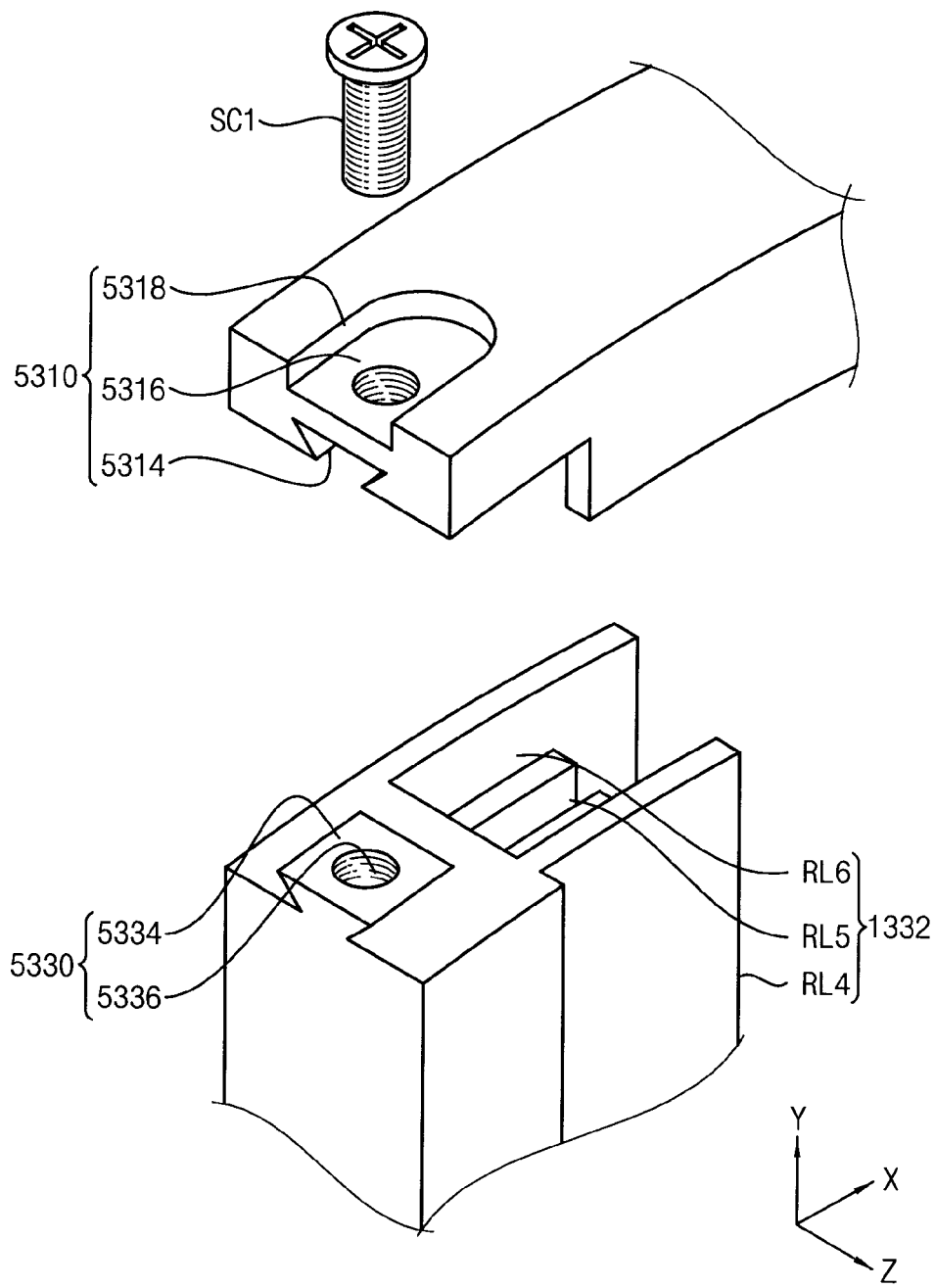
FIG. 8 is a partial exploded perspective view schematically illustrating another exemplary embodiment of an upper horizontal frame and a left vertical frame in accordance with the invention.

FIG. 8 is a partial exploded perspective view schematically illustrating an upper horizontal frame and a left vertical frame in accordance with another exemplary embodiment of the invention.

Referring to FIGS. 1, 2 and 8, a groove member 5314 and a first coupling hole 5316 are defined through a first surface of an edge portion of the upper frame part 5310 coupled to an edge portion of the left frame part 5330. The first coupling hole 5316 is defined to penetrate a center portion of the groove member 5314. A groove 5318 for coupling a screw may be provided through a second surface of an edge portion of the upper frame part 5310. A depth of the groove 5318 for coupling a screw may correspond with a thickness of a head of the first screw SC1.

A protruding member 5334 and a second coupling hole 5336 are defined through an edge portion of the left frame part 5330 facing the first surface of the edge portion of the upper frame part 5310. The protruding member 5334 is provided to correspond with a groove member 5314 of the upper frame part 5310. The second coupling hole 5336 is defined to penetrate a center portion of the protruding member 5334.

In the illustrated exemplary embodiment, the protruding member 5334 has a wedge shape, and the groove member 5314 has a shape so as to insert the protruding member 5334. In an exemplary embodiment, the wedge shape may be extended in a length direction of the upper frame part 5310, as shown in FIG. 8. In this case, the left frame part 5330 is shifted in +X-axis direction, so that the protruding member 5334 of the left frame part 5330 is inserted into the groove member 5314 of a wedge shape disposed on the upper frame part 5310. That is, the protruding member 5334 of the left frame part 5330 may be coupled to the groove member 5314 of the upper frame part 5310 in a slide type along +X-axis direction.

For another exemplary embodiment, the wedge shape may be extended in a normal line direction of the length direction of the upper frame part 5310. In this case, the left frame part 5330 is shifted in +Z-axis direction, so that the protruding member 5334 of the left frame part 5330 is inserted into the groove member 5314 of a wedge shape disposed on the upper frame part 5310. That is, the protruding member 5334 of the left frame part 5330 may be coupled to the groove member 5314 of the upper frame part 5310 in a slide type along +Z-axis direction.

When the upper frame part 5310 is coupled to the left frame part 5330, the protruding member 5334 is inserted into the groove member 5314. Thus, a twisting generated by a spring back effect in the upper frame part 5310 and left frame part 5330 that are coupled to each other may be effectively prevented.

Figure 9:
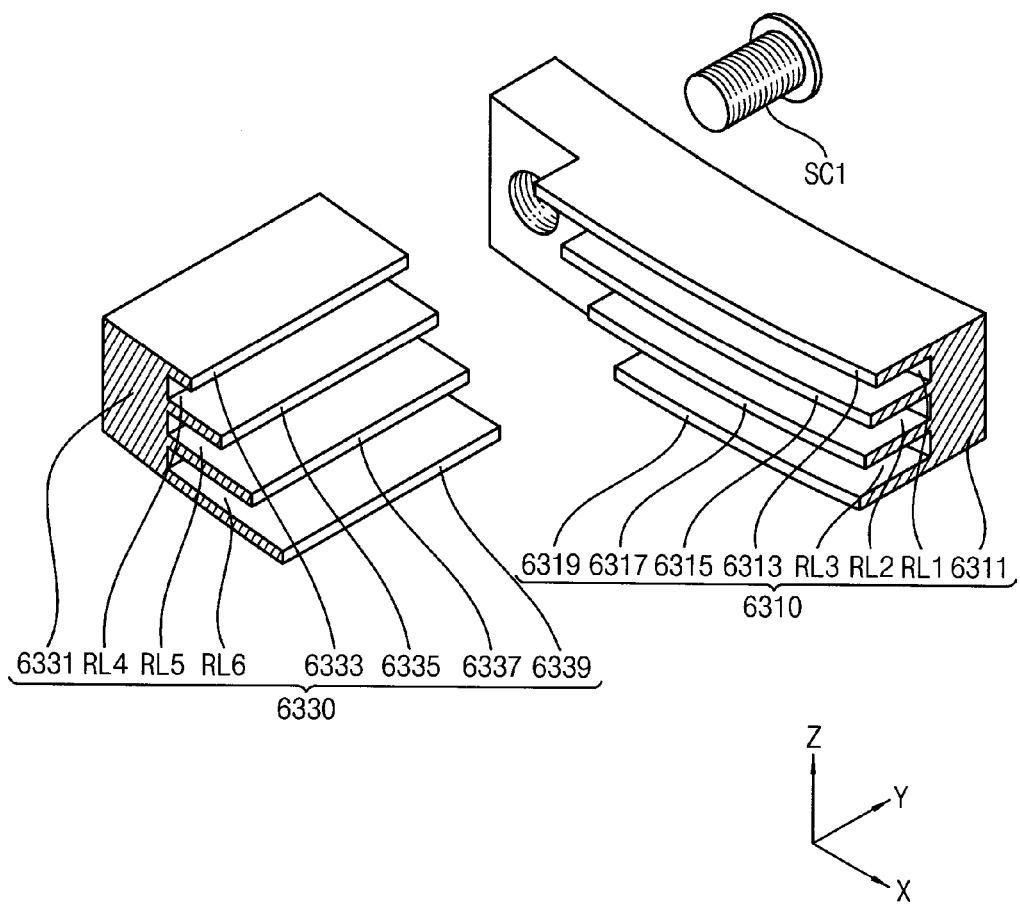
FIG. 9 is a partial exploded perspective view schematically illustrating another exemplary embodiment of an upper horizontal frame and a left vertical frame in accordance with the invention.
Figure 10A:
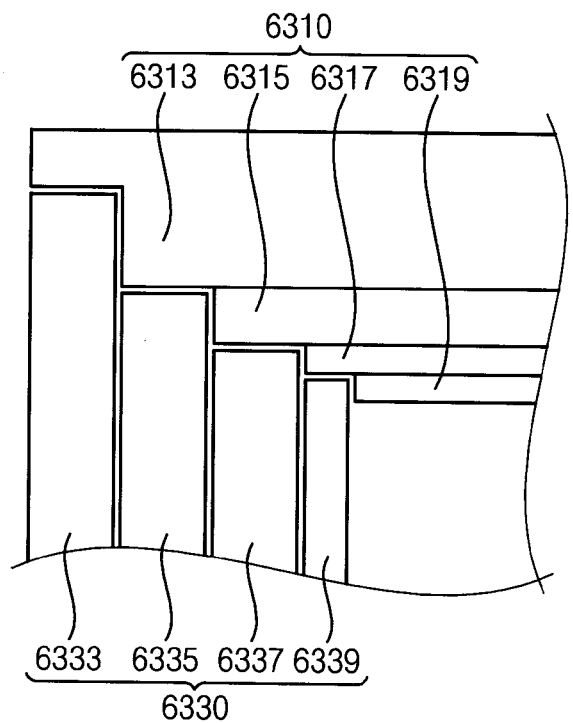
FIG. 10A is a front view schematically illustrating an upper horizontal frame and a left vertical frame that are coupled to each other in FIG. 9.
Figure 10B:
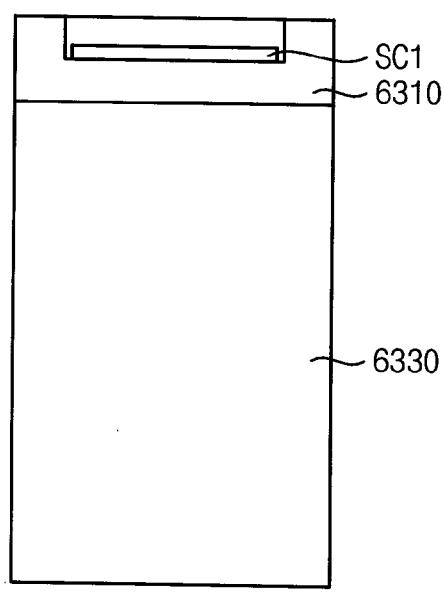
FIG. 10B is a side view schematically illustrating an upper horizontal frame and a left vertical frame that are coupled to each other in FIG. 9.
Figure 10C:
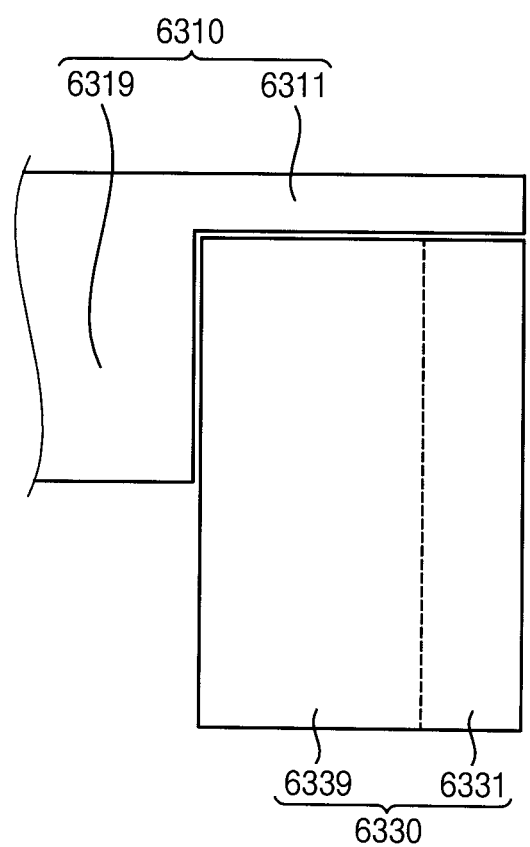
FIG. 10C is a rear view schematically illustrating an upper horizontal frame and a left vertical frame that are coupled to each other in FIG. 9.

FIG. 9 is a partial exploded perspective view schematically illustrating an upper horizontal frame and a left vertical frame in accordance with another exemplary embodiment of the invention. FIG. 10A is a front view schematically illustrating an upper horizontal frame and a left vertical frame that are coupled to each other in FIG. 9. FIG. 10B is a side view schematically illustrating an upper horizontal frame and a left vertical frame that are coupled to each other in FIG. 9. FIG. 10C is a rear view schematically illustrating an upper horizontal frame and a left vertical frame that are coupled to each other in FIG. 9.

Referring to FIGS. 9 to 10C, an upper horizontal frame 6310 has a curved shape, and a left vertical frame 6330 has a straight line shape. The upper horizontal frame 6310 and the left vertical frame 6330 are coupled to each other by a first screw SC1. In order to couple the first screw SC1, a screw coupling hole (reference numeral is not indicated) is defined through an edge portion of the upper horizontal frame 6310, and a screw coupling hole (not shown) is defined through an edge portion of the left vertical frame 6330.

The upper horizontal frame 6310 includes a horizontal body portion 6311, a first branch portion 6313 branched from the horizontal body portion 6311, a second branch portion 6315 branched from the horizontal body portion 6311, a third branch portion 6317 branched from the horizontal body portion 6311, and a fourth branch portion 6319 branched from the horizontal body portion 6311. The first to fourth branch portions 6313, 6315, 6317 and 6319 are parallel with each other. A width of the fourth branch portion 6319 taken along the Y-axis is greater than that of the third branch portion 6317 taken along the Y-axis, and a width of the third branch portion 6317 taken along the Y-axis is greater than that of the second branch portion 6315 taken along the Y-axis. Moreover, a width of the second branch portion 6315 taken along the Y-axis is greater than that of the first branch portion 6313 taken along the Y-axis. The first branch portion 6313 and the second branch portion 6315 are spaced apart from each other to define a first rail RL1, and the second branch portion 6315 and the third branch portion 6317 are spaced apart from each other to define a second rail RL2. The third branch portion 6317 and the fourth branch portion 6319 are spaced apart from each other to define a third rail RL3. The first to third rails RL1, RL2 and RL3 are substantially the same as the first to third rails RL1, RL2 and RL3 described with reference to FIG. 2, and thus any repetitive detailed explanation may hereinafter be omitted.

The left vertical frame 6330 includes a vertical body portion 6331, a fifth branch portion 6333 branched from the vertical body portion 6331, a sixth branch portion 6335 branched from the vertical body portion 6331, a seventh branch portion 6337 branched from the vertical body portion 6331, and an eighth branch portion 6339 branched from the vertical body portion 6331. The fifth to eighth branch portions 6333, 6335, 6337 and 6339 are parallel with each other. A width of the eighth branch portion 6339 taken along the X-axis is greater than that of the seventh branch portion 6337 taken along the X-axis, and a width of the seventh branch portion 6337 taken along the X-axis is greater than that of the sixth branch portion 6335 taken along the X-axis. Moreover, a width of the sixth branch portion 6335 taken along the X-axis is greater than that of the fifth branch portion 6333 taken along the X-axis. The fifth branch portion 6333 and the sixth branch portion 6335 are spaced apart from each other to define a fourth rail RL4, and the sixth branch portion 6335 and the seventh branch portion 6337 are spaced apart from each other to define a fifth rail RL5. The seventh branch portion 6337 and the eighth branch portion 6339 are spaced apart from each other to define a sixth rail RL6. The fourth to sixth rails RL4, RL5 and RL6 are substantially the same as the fourth to sixth rails RL4, RL5 and RL6 described with reference to FIG. 2, and thus any repetitive detailed explanation may hereinafter be omitted.

In the illustrated exemplary embodiment, a length of the first branch portion 6313 taken along the X-axis is longer than that of the second branch portion 6315 taken along the X-axis, and a length of the second branch portion 6315 taken along the X-axis is longer than that of the third branch portion 6317 taken along the X-axis. A length of the third branch portion 6317 taken along the X-axis is longer than that of the fourth branch portion 6319 taken along the X-axis. Moreover, a length of the fifth branch portion 6333 taken along the Y-axis, a length of the sixth branch portion 6335 taken along the Y-axis, a length of the seventh branch portion 6337 taken along the Y-axis and a length of the eighth branch portion 6339 taken along the Y-axis are substantially equal to each other. Thus, edge portions of the fifth to eighth branch portions 6333, 6335, 6337 and 6339 branched from the vertical body portion 6331 of the left vertical frame 6330 make contact a horizontal body portion 6311 of the upper horizontal frame 6310.

In the illustrated exemplary embodiment, a groove member is omitted from an edge portion of the upper horizontal frame 6310, and a protruding member is omitted from an edge portion of the left vertical frame 6330.

In another exemplary embodiment, a protruding member described in the above exemplary embodiments may be disposed on an edge portion of the left vertical frame 6330 making contact the upper horizontal frame 6310, and a groove member described in the above exemplary embodiments may be defined in an edge portion of the upper horizontal frame 6310 making contact the left vertical frame 6330.

As described above, according to the illustrated exemplary embodiment, a horizontal frame and a vertical frame are coupled in a stepped shape by branch portions branched to have the different widths. Thus, it may effectively prevent light leakage from being generated in a backlight assembly and a display panel that are received in a concavely curved frame. Moreover, it may effectively prevent an external foreign substance from being flowed into a display panel and a backlight assembly.

Figure 11:
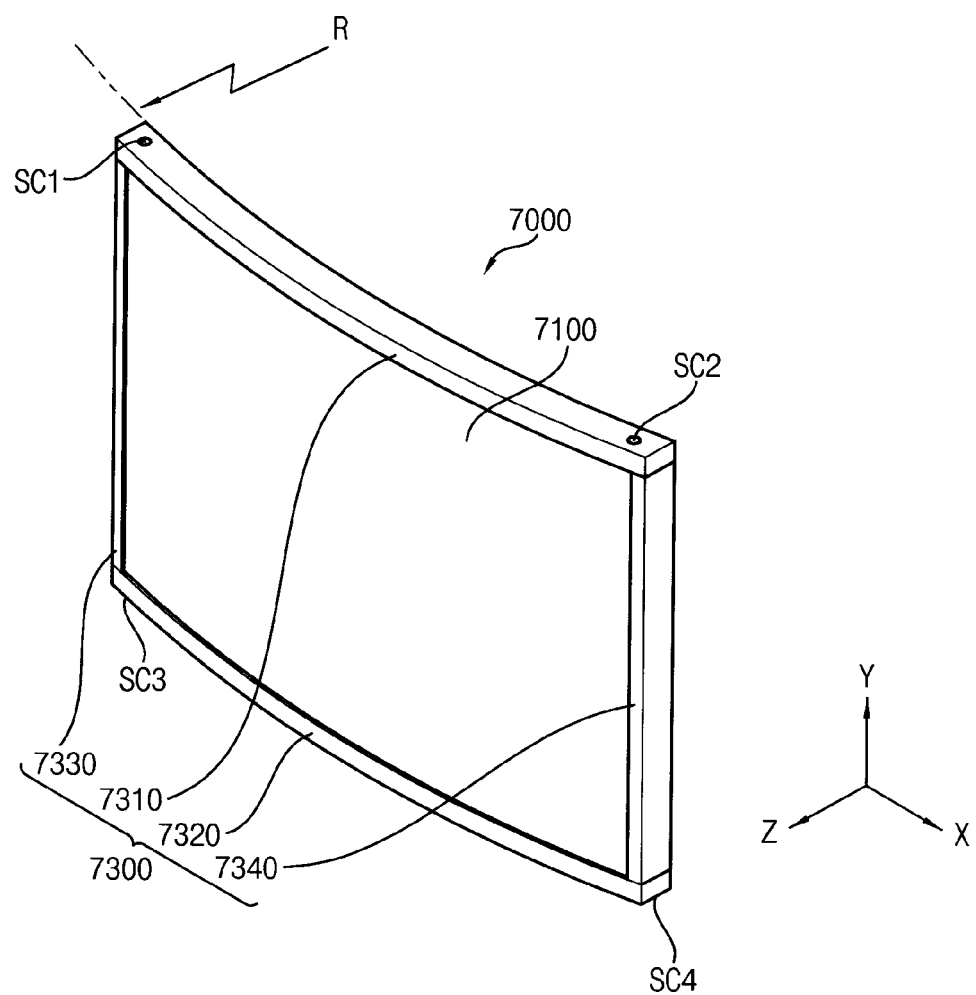
FIG. 11 is a perspective view schematically illustrating another exemplary embodiment of a curved display device according to the invention.
Figure 12:
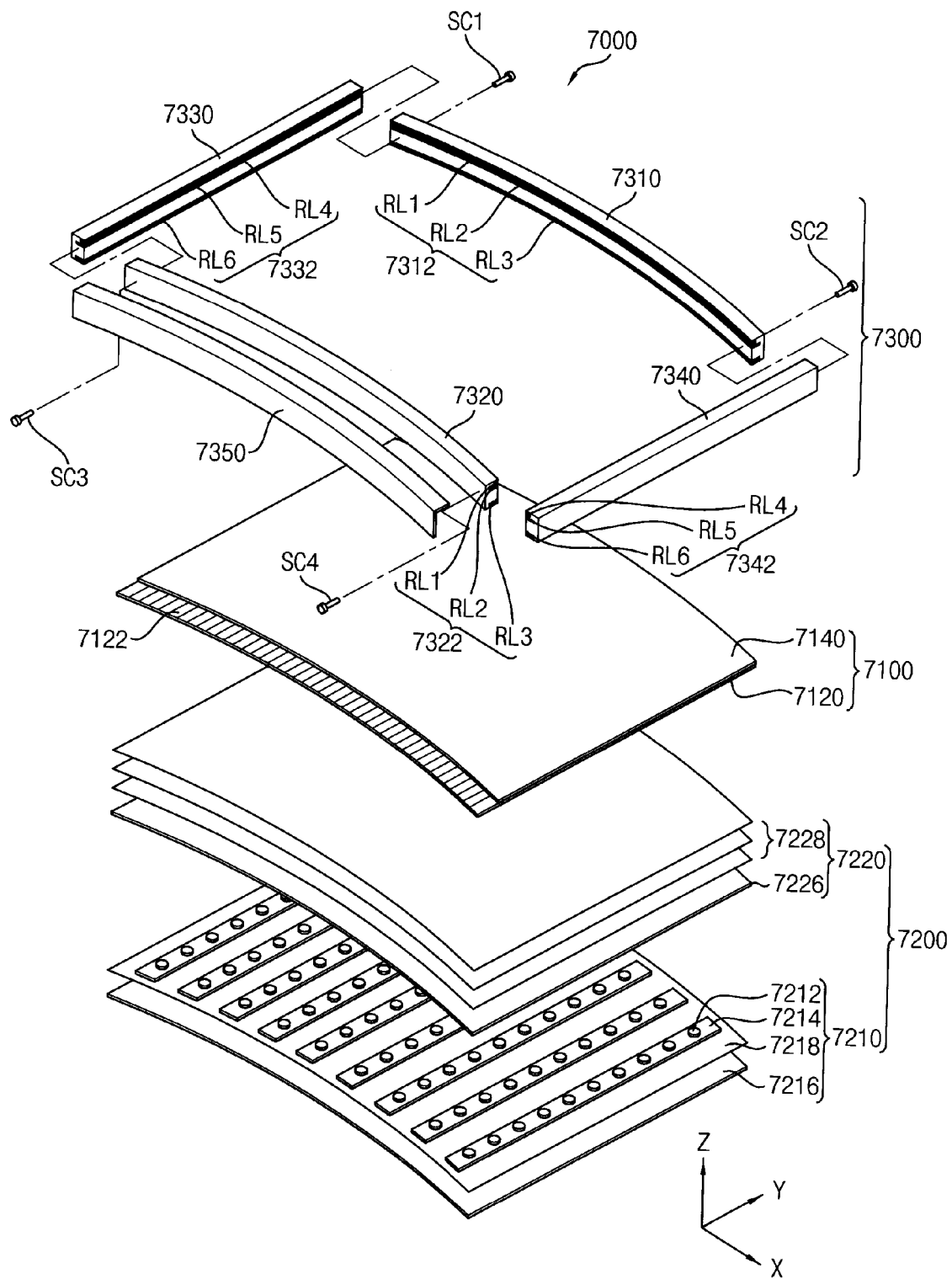
FIG. 12 is an exploded perspective view schematically illustrating a curved display device of FIG. 11.

FIG. 11 is a perspective view schematically illustrating a curved display device 7000 according to another exemplary embodiment of the invention. FIG. 12 is an exploded perspective view schematically illustrating a curved display device 7000 of FIG. 11.

Referring to FIGS. 11 and 12, a curved display device 7000 according to another exemplary embodiment of the invention includes a display panel 7100, a flat backlight unit 7200 and a convexly curved frame 7300. The display panel 7100 is convexly bent to have a uniform curvature when viewed from an X-Y plane. In the illustrated exemplary embodiment, a curvature radius R corresponding to the curvature is about 1,000 mm to about 5,000 mm. In other exemplary embodiments, various curvature radiuses may be adapted thereto.

The display panel 7100 may have a curved shape of uniform curvature. The display panel 7100 may be an LCD panel, a PDP, an OLED panel, etc. In the illustrated exemplary embodiment, the display panel 7100 may be an LCD panel including an array substrate 7120, a color filter substrate 7140 facing the array substrate 7120, and a liquid crystal layer interposed between the array substrate 7120 and the color filter substrate 7140. A size of the color filter substrate 7140 is substantially smaller than that of the array substrate 7120. Thus, an area not covered by the color filter substrate 7140 is exposed. A pad part 7122 is disposed on an exposed area of the array substrate 7120.

The display panel 7100 may be curved before the display panel 7100 is inserted into the convexly curved frame 7300. In another exemplary embodiment, the display panel 7100 may be curved after the display panel 1100 is inserted into the convexly curved frame 7300. In an exemplary embodiment, when the display panel 7100 has a flexible type, the display panel 7100 may be curved after the display panel 7100 is inserted into the convexly curved frame 7300. For another exemplary embodiment, when the display panel 7100 has a ridge type, the display panel 7100 may be manufactured to have a curved shape of a predetermined curvature before the display panel 7100 is inserted into the convexly curved frame 7300.

The display panel 7100 may have a curved shape by various manufacturing methods. In an exemplary embodiment, a flat display panel is disposed between a first curved mold of a concave shape and a second curved mold of a convex shape facing the first curved mold, and then the display panel 7100 may be manufactured through a heat treatment and a pressing treatment. In this case, a bottom surface of an array substrate of the flat display panel is disposed to contact the first curved mold.

The array substrate 7120 is a substrate on which TFTs that are switching elements are provided in a matrix shape. In the illustrated exemplary embodiment, the array substrate 7120 has a curved shape of uniform curvature. The TFT has a source terminal connected to a data line, a gate terminal connected to a gate line, and a drain terminal connected to a pixel electrode of a transparent conductive material. A data pad part 7122 extended from the data line is disposed on a non-display area of the array substrate 7120. In another exemplary embodiment, a gate pad part extended from the gate line may be further disposed on the non-display area of the array substrate 7120.

The color filter substrate 7140 is disposed to face the array substrate 7120. The color filter substrate 7140 includes a red pixel, a green pixel and a blue pixel that are provided to realize colors. In the illustrated exemplary embodiment, the color filter substrate 7140 has a curved shape of uniform curvature. A common electrode is disposed on the color filter substrate 7140, which is opposite to the pixel electrode of the array substrate 7120. The common electrode includes an optically transparent and electrically conductive material.

In another exemplary embodiment, the display panel 7100 may include an array substrate on which color filters are provided and an opposite substrate on which a common electrode is provided to face the array substrate.

When a power is applied to a gate terminal of the TFT and the TFT is turned on, an electric field is generated between the pixel electrode and the common electrode. The electric field varies an aligning angle of the liquid crystal molecules interposed between the array substrate 7120 and the color filter substrate 7140. Thus, a light transmittance of the liquid crystal layer is varied in accordance with the variation of the aligning angle of the liquid crystal, so a desired image may be obtained.

The display panel 7100 may include a first polarization film (not shown) disposed below the array substrate 7120 and a second polarization film (not shown) disposed on the color filter substrate 7140. The first polarization film includes a light transmitting axis of a first direction to polarize lights in a first direction. The second polarization film includes a light transmitting axis of a second direction to polarize lights in a second direction. In an exemplary embodiment, the light transmitting axis of the first polarization film may substantially perpendicular to the light transmitting axis of the second polarization film.

The backlight unit 7200 is disposed at a rear surface of the display panel 7100 to provide lights to the display panel 7100. In the illustrated exemplary embodiment, the backlight unit 7200 has a curved shape which is bent in accordance with a curvature of the display panel 7100. In the illustrated exemplary embodiment, a curvature radius of the backlight unit 1200 may be about 1,000 mm to 4,000 mm. In the illustrated exemplary embodiment, when the display panel 7100 has a curvature radius of one of about 1,000 mm to about 4,000 mm, the backlight unit 7200 may have a curvature radius substantially smaller than a curvature radius of the display panel 7100. In an exemplary embodiment, when the display panel 7100 has a curvature radius of about 4,000 mm, the backlight unit 7200 may have a curvature radius substantially greater than about 1,000 mm and substantially smaller than about 4,000 mm.

The backlight unit 7200 includes a light source assembly 7210 emitting lights and an optical assembly 7220 enhancing light characteristics emitted from the light source assembly 7210. In the illustrated exemplary embodiment, a curvature radius of the optical assembly 7220 may be substantially smaller than a curvature radius of the display panel 7100, and may be substantially greater than a curvature radius of the light source assembly 7210.

The light source assembly 7210 includes a plurality of LED packages 7212 emitting lights and a PCB 7214 on which the LED packages 7212 are mounted. A signal wiring (not shown) for providing the LED packages 7212 with driving voltages, is disposed on the PCB 7214. The light source assembly 7210 may be disposed in correspondence with a direction parallel with a long side of the display panel 7100.

In another exemplary embodiment, the light source assembly 7210 may be disposed in correspondence with a direction parallel with a short side of the display panel 7100.

Moreover, in order to effectively prevent a blue transmittance ratio from being decreased by a buckling phenomenon generated in the display panel 7100, it may vary a disposing or a structure of the LED packages 7212. In an exemplary embodiment, when viewed from an X-Y plane of the display panel 7100, a light amount of blue, which are emitted from the LED packages 7212 disposed on a middle area between a central portion parallel with Y-axis and an edge portion parallel with Y-axis, may be increased. In an exemplary embodiment, it may increase the number of blue LEDs rather than the number of red LEDs or the number of green LEDs, thereby increasing a light amount of blue. For another exemplary embodiment, it may increase a voltage provided to a blue LED rather than a voltage provided to a red LED or a voltage provided to a green LED, thereby increasing a light amount of blue.

The light source assembly 7210 may further include a bottom plate 7216 and a reflection sheet 7218.

The bottom plate 7216 has a curved shape of a uniform curvature to secure PCBs 7214 having LED packages 7212 mounted thereon. In the illustrated exemplary embodiment, the bottom plate 7216 may have a curved shape by various manufacturing methods. In an exemplary embodiment, a flat bottom plate is disposed between a first curved mold of a concave shape and a second curved mold of a convex shape facing the first curved mold, and then the bottom plate 7216 may be manufactured through a heat treatment and a pressing treatment. In this case, a bottom surface of the flat bottom plate is disposed to contact the second curved mold.

The reflection sheet 7218 is disposed on the bottom plate 7216 and is disposed below the light source assembly 7210 to reflect lights incident from the light source assembly 7210 toward the diffusion plate 7226.

The optical assembly 7220 may include a diffusion plate 7226 and optical sheets 7228.

The diffusion plate 7226 has a curved shape of uniform curvature. The diffusion plate 7226 diffuses lights emitted from the light source assembly 7210 or lights reflected by the reflection sheet 7218 to provide the optical sheets 7228 with the diffused lights. In the illustrated exemplary embodiment, the diffusion plate 7226 may have a curved shape by various manufacturing methods. In an exemplary embodiment, a flat diffusion plate is disposed between a first curved mold of a concave shape and a second curved mold of a convex shape facing the first curved mold, and then the diffusion plate 7226 may be manufactured through a heat treatment and a pressing treatment. In this case, a bottom surface of the flat bottom plate is disposed to contact the second curved mold.

The optical sheets 7228 are disposed on the diffusion plate 7226 to increase efficiency of lights incident from the diffusion plate 7226. The optical sheets 7228 may include a diffusion sheet re-diffusing lights diffused by the diffusion plate 7226 and a prism sheet condensing the lights diffused by the diffusion sheet. In an exemplary embodiment, the prism sheet may include a vertical prism sheet condensing lights in a vertical direction and a horizontal prism sheet condensing lights in a horizontal direction.

In the illustrated exemplary embodiment, the light source assembly 7220 includes a diffusion plate 7226 and optical sheets 7228 to be guided to the second rail RL2. In this case, the optical sheets 7228 disposed adjacent to the display panel 7100 are exposed in air, thereby generating a sheet wrapping. In order to effectively prevent a sheet wrapping, an additional transparent plate (not shown) may be further disposed. The transparent plate may have a curved shape of a uniform curvature. That is, the optical sheets 7228 are disposed between the transparent plate and the diffusion plate 7226 to effectively prevent a sheet wrapping of the optical sheets 7228.

The convexly curved frame 7300 includes an upper frame part 7310, a lower frame part 7320, a left frame part 7330 and a right frame part 7340 to secure the display panel 7100 and the backlight unit 7200. The convexly curved frame 7300 has a curved shape of uniform curvature. In the illustrated exemplary embodiment, the upper frame part 7310 and the lower frame part 7320 define a long-side frame part, and the left frame part 7330 and the right frame part 7340 define a short-side frame part. In the illustrated exemplary embodiment, in order to define a convexly curved frame 7300, a protruding member is disposed on one frame part and a groove member is provided through another frame part, so that a twisting of a convexly curved frame 7300 may be effectively prevented.

In an exemplary embodiment, protruding members are provided in two edge portions of the left frame part 7330 and in two edge portions of the right frame part 7340, respectively, and groove members in which the protruding member is inserted are defined through two edge portions of the upper frame part 7310 and through two edge portions of the lower frame part 7320, respectively. Thus, when the protruding members are coupled to the frame parts 7310, 7320, 7330 and 7340 to form a convexly curved frame 7300, the protruding member is inserted into the groove member to be secured so that a twisting of a convexly curved frame 7300 generated by a spring back effect may be effectively prevented.

A first guide rail portion 7312, which is defined in the surface of the corresponding frame part bent to have a first curvature to guide an upper side of the display panel 7100 and an upper side of the backlight unit 7200, is provided through the upper frame part 7310. The upper frame part 7310 is coupled to the left frame part 7330 through the first screw SC1, and is coupled to the right frame part 7340 through the second screw SC2. A groove member and a first coupling hole described in the above exemplary embodiments are defined in two edge portions of the upper frame part 7310.

A second guide rail portion 7322, which is defined in the surface of the corresponding frame part bent to have the first curvature to guide a lower side of the display panel 7100 and a lower side of the backlight unit 7200, is provided through the lower frame part 7320. The lower frame part 7320 is coupled to the left frame part 7330 through a third screw SC3, and is coupled to the right frame part 7340 through a fourth screw SC4. A groove member and a first coupling hole described in the above exemplary embodiments are defined in two edge portions of the lower frame part 7320.

In the illustrated exemplary embodiment, each of the first and second guide rail portions 7312 and 7322 includes a first rail RL1, a second rail RL2 and a third rail RL3. The first rail RL1 is provided adjacent to a front surface of corresponding frame part to guide an upper side (or a lower side) of the display panel 7100. The first rail RL1 is defined in the surface of the corresponding frame part bent to correspond to an upper side (or a lower side) of the display panel 7100 having a curved shape of a uniform curvature. The second rail RL2 is provided in a rear surface of the first rail RL1 to guide the optical assembly 7220 of the backlight unit 7200. The second rail RL2 is defined in the surface of the corresponding frame part bent to correspond to the optical assembly 7220 having a curved shape of a uniform curvature. The third rail RL3 is provided between a rear surface of the second rail RL2 and a rear surface of corresponding frame part to guide a light source assembly 7210 of the backlight unit 7200. The third rail RL3 is defined in the surface of the corresponding frame part bent to correspond to the light source assembly 7210 having a curved shape of a uniform curvature.

The left frame part 7330 has a straight line shape to be coupled to a first end of the upper frame part 7310 and a first end of the lower frame part 7320. In an exemplary embodiment, the coupling may be realized through nuts, bolts, etc.

In the exemplary embodiment, the left frame part 7330 is coupled to the upper frame part 7310 through the first screw SC1, and is coupled to the lower frame part 7320 through the third screw SC3.

A protruding member and a second coupling hole described in the above exemplary embodiments are defined in two edge portions of the upper frame part 7310. A third guide rail portion 7332 of a straight line shape is provided at the left frame part 7330 so as to guide a left side of the display panel 7100 and a left side of the backlight unit 7200. The third guide rail portion 7332 includes a fourth rail RL4, a fifth rail RL5 and a sixth rail RL6 that are parallel with each other.

The right frame part 7340 has a straight line shape to be coupled to a second end of the upper frame part 7310 and a second end of the lower frame part 7320. In an exemplary embodiment, the coupling may be realized through nuts, bolts, etc.

In the illustrated exemplary embodiment, the right frame part 7340 is coupled to the upper frame part 7310 through the second screw SC2, and is coupled to the lower frame part 7320 through the fourth screw SC4.

A groove member and a second coupling hole described in the above exemplary embodiments are defined in two edge portions of the right frame part 7340. A fourth guide rail portion 7342 of a straight line shape is provided at the right frame part 7340 so as to guide a right side of the display panel 7100 and a right side of the backlight unit 7200. The fourth guide rail portion 7342 includes a fourth rail RL4, a fifth rail RL5 and a sixth rail RL6 that are parallel with each other.

Although not shown in FIGS. 11 and 12, the upper frame part 7310, the lower frame part 7320, the left frame part 7330 and the right frame part 7340 providing the convexly curved frame 7300 may be configured by a mold of an injection molding material and a chassis of a metal material. Thus, it may effectively reduce a manufacturing cost and a weight of a convexly curved display device, and reinforce a strong of a curved display device.

In an exemplary embodiment, the concavely curved frame 7300 may further include a frame cover 7350 covering the lower frame part 7320.

As described above, according to the illustrated exemplary embodiment, a convexly curved frame having a guide rail portion provided therethrough is configured, so that it may maintain a curvature of a convexly curved frame and curvatures of an optical assembly and a light source assembly of a convexly curved backlight unit. Moreover, a convexly curved display panel and a convexly curved backlight unit may be secured to a convexly curved frame to have a uniform distance.

Accordingly, a convexly curved backlight unit spaced apart from a convexly curved display panel in a uniform distance provides uniform lights to the convexly curved display panel, so that display characteristics of a convexly curved display device may be enhanced. In a convexly curved display device, various elements for providing lights with a convexly curved display panel are disposed in a rear surface of the concavely curved display panel. However, rails are provided through a convexly curved frame, so that a distance between various elements may be uniformly maintained by the rails.

As described above, according to the illustrated exemplary embodiment, in frame parts coupled to each other to form a curved rectangular frame, a protruding member is disposed on one frame part and a groove member is provided through another frame part, so that a twisting of a curved rectangular frame may be effectively prevented so that it may effectively prevent display characteristics of a display device from being decreased.

Having described exemplary embodiments in accordance with the disclosure of invention, it is further noted that it is readily apparent to those of reasonable skill in the art in view of the foregoing that various modifications may be made without departing from the spirit and scope of the present teachings.

What is claimed is:

1. A curved frame for securing a display panel, the curved frame comprising:
    two long-side frame parts having a curved shape, each of the two long-side frame parts comprising a groove member provided through each of edge portions thereof and a first coupling hole defined to penetrate the groove member; and
    two short-side frame parts having a straight line shape, each of the two short-side frame parts comprising a protruding member provided in correspondence with the groove member of the two long-side frame parts and a second coupling hole defined to penetrate the protruding member,
    wherein each of the two short-side frame parts coupled to the two long-side frame parts defines a rectangular frame shape,
    wherein an interface between the protruding member provided in correspondence with the groove member prevents rotation of the two short-side frame parts relative to a longitudinal axis defining the straight line shape of the two short-side frame parts, and
    wherein the second coupling hole defined to penetrate the protruding member and the protruding member both extend in a same direction that the longitudinal axis defining the straight line shape of the two short-side frame parts extends.

2. The curved frame of claim 1,
    wherein the protruding member and the groove member have a polygon shape, and
    wherein the protruding member is inserted to the groove member.

3. The curved frame of claim 2,
    wherein the polygon shape comprises a parallelogram shape,
    wherein a width of the parallelogram shape is decreased toward a center portion of one of the two long-side frame parts from an edge portion of the one of the long-side frame part.

4. The curved frame of claim 1,
    wherein the protruding member and the groove member have a wedge shape, and
    wherein the protruding member is slidably disposed into the groove member.

5. The curved frame of claim 4, wherein the wedge shape is extended in a length direction of the two long-side frame parts or a normal line direction of the length direction.

6. The curved frame of claim 1, wherein the two long-side frame parts and the two short-side frame parts are coupled to each other.

7. The curved frame of claim 6, wherein each of screws is coupled to edge portions of the short-side frame parts via the edge portions of the two long-side frame parts, respectively.

8. The curved frame of claim 1, wherein a guide rail part is provided through the two long-side frame parts and the short-side frame parts, respectively.

9. The curved frame of claim 1, wherein the two long-side frame parts and the short-side frame parts comprise an injection molding material.

10. The curved frame of claim 1, wherein the two long-side frame parts having a curved shape are concave corresponding to shape of the display panel having a concave curved shape.

11. A display device comprising:
a display panel;
a backlight unit disposed on a rear surface of the display panel; and
a curved frame which secures the display panel and the backlight unit, and comprises:
two long-side frame parts having a curved shape, each of the two long-side frame parts comprising a groove member provided through each of edge portions thereof and a first coupling hole defined to penetrate the groove member; and
two short-side frame parts having a straight line shape, each of the two short-side frame parts comprising a protruding member provided in correspondence with the groove member of the two long-side frame parts and a second coupling hole defined to penetrate the protruding member,
wherein the two short-side frame parts coupled to the two long-side frame parts defines a rectangular frame shape,
wherein an interface between the protruding member provided in correspondence with the groove member prevents rotation of the two short-side frame parts relative to a longitudinal axis defining the straight line shape of the two short-side frame parts, and
wherein the second coupling hole defined to penetrate the protruding member and the protruding member both extend in a same direction that the longitudinal axis defining the straight line shape of the two short-side frame parts extends.

12. The display device of claim 11,
wherein the protruding member and the groove member have a polygon shape, and
wherein the protruding member is inserted to the groove member.

13. The display device of claim 11,
wherein the protruding member and the groove member have a wedge shape,
wherein the protruding member is slidably disposed into the groove member in a slide type.

14. The display device of claim 11, wherein the two long-side frame parts and the two short-side frame parts are coupled to each other by four screws.

15. The display device of claim 11, wherein the two long-side frame parts having a curved shape are concave corresponding to shape of the display panel having a concave curved shape.

* * * * *